US012542391B2

(12) United States Patent
Nakamura

(10) Patent No.: US 12,542,391 B2
(45) Date of Patent: Feb. 3, 2026

(54) CONNECTOR ASSEMBLY

(71) Applicant: Japan Aviation Electronics Industry, Limited, Tokyo (JP)

(72) Inventor: Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 281 days.

(21) Appl. No.: 18/454,393

(22) Filed: Aug. 23, 2023

(65) Prior Publication Data

US 2024/0178602 A1 May 30, 2024

(30) Foreign Application Priority Data

Nov. 24, 2022 (JP) ................................ 2022-187294

(51) Int. Cl.
*H01R 13/506* (2006.01)
*H01R 13/422* (2006.01)
*H01R 13/639* (2006.01)

(52) U.S. Cl.
CPC ......... *H01R 13/422* (2013.01); *H01R 13/506* (2013.01); *H01R 13/639* (2013.01)

(58) Field of Classification Search
None
See application file for complete search history.

(56) References Cited

U.S. PATENT DOCUMENTS

| | | | | |
|---|---|---|---|---|
| 7,465,171 | B2 * | 12/2008 | Miyazaki | H01R 13/20 439/74 |
| 7,993,146 | B2 * | 8/2011 | Midorikawa | H01R 12/716 439/74 |
| 8,888,508 | B2 * | 11/2014 | Chen | H01R 12/716 439/74 |
| 2013/0217270 | A1 | 8/2013 | Miyazaki | |
| 2013/0260587 | A1 * | 10/2013 | Chen | H01R 12/712 439/284 |
| 2019/0148901 | A1 | 5/2019 | Komoto | |

FOREIGN PATENT DOCUMENTS

| | | |
|---|---|---|
| JP | 2019087515 A | 6/2019 |

* cited by examiner

*Primary Examiner* — Tho D Ta
(74) *Attorney, Agent, or Firm* — MUNCY, GEISSLER, OLDS & LOWE, P.C.

(57) ABSTRACT

A connector assembly includes a first connector and a second connector, the first connector having a first contacting portion disposed on a lateral surface of a retention projection, a second contacting portion disposed on a lateral surface of the retention projection opposite to the lateral surface having the first contacting portion thereon at a position closer to a base portion of the retention projection than the first contacting portion is, and a third contacting portion disposed on the first exposed surface at a position away from the lateral surface, having the first contacting portion thereon, of the retention projection in an opposite direction from the second contacting portion.

22 Claims, 35 Drawing Sheets

CONNECTOR ASSEMBLY

BACKGROUND OF THE INVENTION

The present invention relates to a connector assembly, particularly to a connector assembly used to fit a module-side connector of a wearable device to a garment-side connector to establish electrical connection therebetween.

In recent years, attention has been drawn to so-called smart clothes that can obtain user's biological data such as the heart rate and the body temperature only by being worn by the user. Such smart clothes have an electrode disposed at a measurement site, and when a wearable device serving as a measurement device is electrically connected to the electrode, biological data can be transmitted to the wearable device.

The electrode and the wearable device can be interconnected by, for instance, use of a connector connected to a conductor drawn from the electrode.

As a connector of this type, for example, JP 2019-87515 A discloses a connector as illustrated in FIG. 74. The connector includes a garment-side connector portion 1 to be attached to a garment and a module-side connector portion 2 to be fitted to the garment-side connector portion 1. The garment-side connector portion 1 includes a module-side connector accommodating portion 3 of recess shape and a plurality of garment-side contacts 4 aligned within the module-side connector accommodating portion 3, and the garment-side contacts 4 are connected to conductor portions of a conductive sheet 5 disposed on the garment. The module-side connector portion 2 includes a plurality of module-side contacts 6 aligned to correspond to the garment-side contacts 4.

When the module-side connector portion 2 is accommodated into the module-side connector accommodating portion 3 of the garment-side connector portion 1, the module-side connector portion 2 is fitted to the garment-side connector portion 1, and the module-side contacts 6 are connected to the garment-side contacts 4.

In addition, when a locking portion 7 of protrusion shape formed in the module-side connector accommodating portion 3 of the garment-side connector portion 1 is fitted to a to-be-locked portion 8 of recess shape formed in the module-side connector portion 2, the fitting state between the garment-side connector portion 1 and the module-side connector portion 2 can be locked.

However, this configuration requires formation of the locking portion 7 in the garment-side connector portion 1 and the to-be-locked portion 8 in the module-side connector portion 2 to prevent the module-side connector portion 2 from coming off the module-side connector accommodating portion 3 of the garment-side connector portion 1 and retain the fitting state between the garment-side connector portion 1 and the module-side connector portion 2, resulting in a complex structure of the connector.

SUMMARY OF THE INVENTION

The present invention has been made to overcome such a conventional problem and provide a connector assembly that can stably maintain a fitting state even with a simple structure.

A connector assembly according to the present invention is one including a first connector and a second connector that are fitted to each other along a fitting direction such that a second contact of the second connector is electrically connected to a first contact of the first connector, wherein the first connector includes a first exposed surface facing the second connector and a retention projection projecting in the fitting direction from the first exposed surface toward the second connector, the second connector includes a second exposed surface facing the first connector and a projection accommodating portion of recess shape which is formed at the second exposed surface and in which at least a part of the retention projection is accommodated, the first connector includes: a first contacting portion disposed on a lateral surface of the retention projection; a second contacting portion disposed on a lateral surface of the retention projection opposite to the lateral surface having the first contacting portion thereon, at a position closer to a base portion of the retention projection than the first contacting portion is; and a third contacting portion disposed on the first exposed surface at a position away from the lateral surface, having the first contacting portion thereon, of the retention projection in an opposite direction from the second contacting portion, and when the first connector and the second connector are fitted to each other, at least a part of the retention projection is accommodated in the projection accommodating portion, the first contacting portion and the second contacting portion separately make contact with an inner surface of the projection accommodating portion, and the third contacting portion makes contact with the second exposed surface, whereby a fitting state between the first connector and the second connector is maintained.

DETAILED DESCRIPTION OF THE INVENTION

Embodiments of the present invention are described below based on the accompanying drawings.

Embodiment 1

Figure 1:
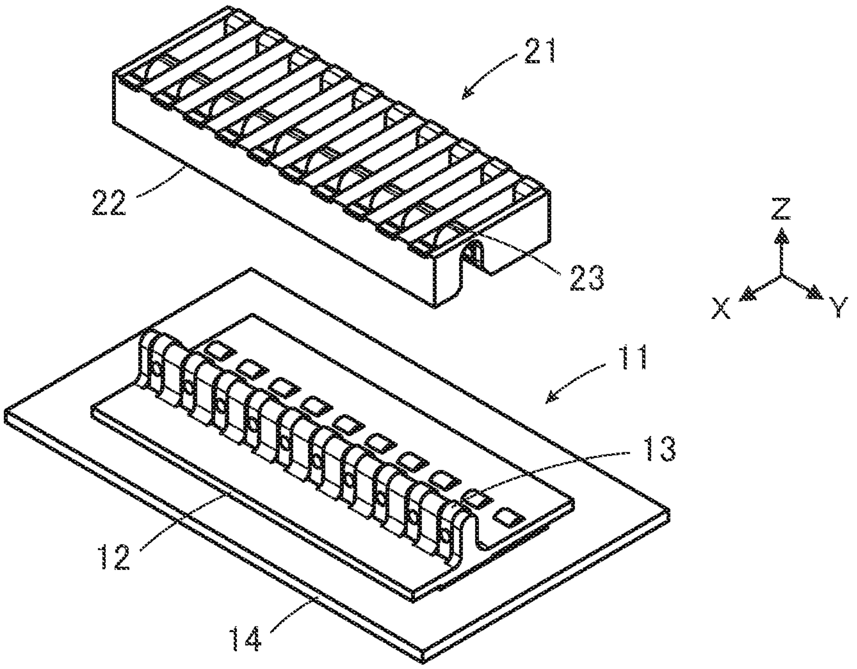
FIG. 1 is a perspective view showing a connector assembly of Embodiment 1 before fitting.

FIG. 1 shows a connector assembly according to Embodiment 1 before fitting. The connector assembly is composed of a first connector 11 and a second connector 21 to be fitted to each other. For instance, the first connector 11 is used as a garment-side connector to be attached to a garment, and the second connector 21 is used as a module-side connector to be fitted to the first connector 11.

The first connector 11 includes: a first insulator 12 made of an insulating material; and a plurality of first contacts 13 aligned in a predetermined direction and held by the first insulator 12. The first insulator 12 is attached to a tab sheet 14.

The second connector 21 includes: a second insulator 22 made of an insulating material; and a plurality of second contacts 23 aligned in a predetermined direction in the same manner as the plurality of first contacts 13 of the first connector 11 and held by the second insulator 22.

The plurality of first contacts 13 and the plurality of second contacts 23 are aligned in parallel to each other at the same alignment pitch.

For convenience, a direction in which the plurality of first contacts 13 and the plurality of second contacts 23 are aligned is defined as "Y direction," a direction from the first connector 11 to the second connector 21 as "+Z direction," and a direction perpendicular to the Y direction and the Z direction as "X direction." The Z direction is a fitting direction in which the second connector 21 is fitted to the first connector 11.

Figure 2:
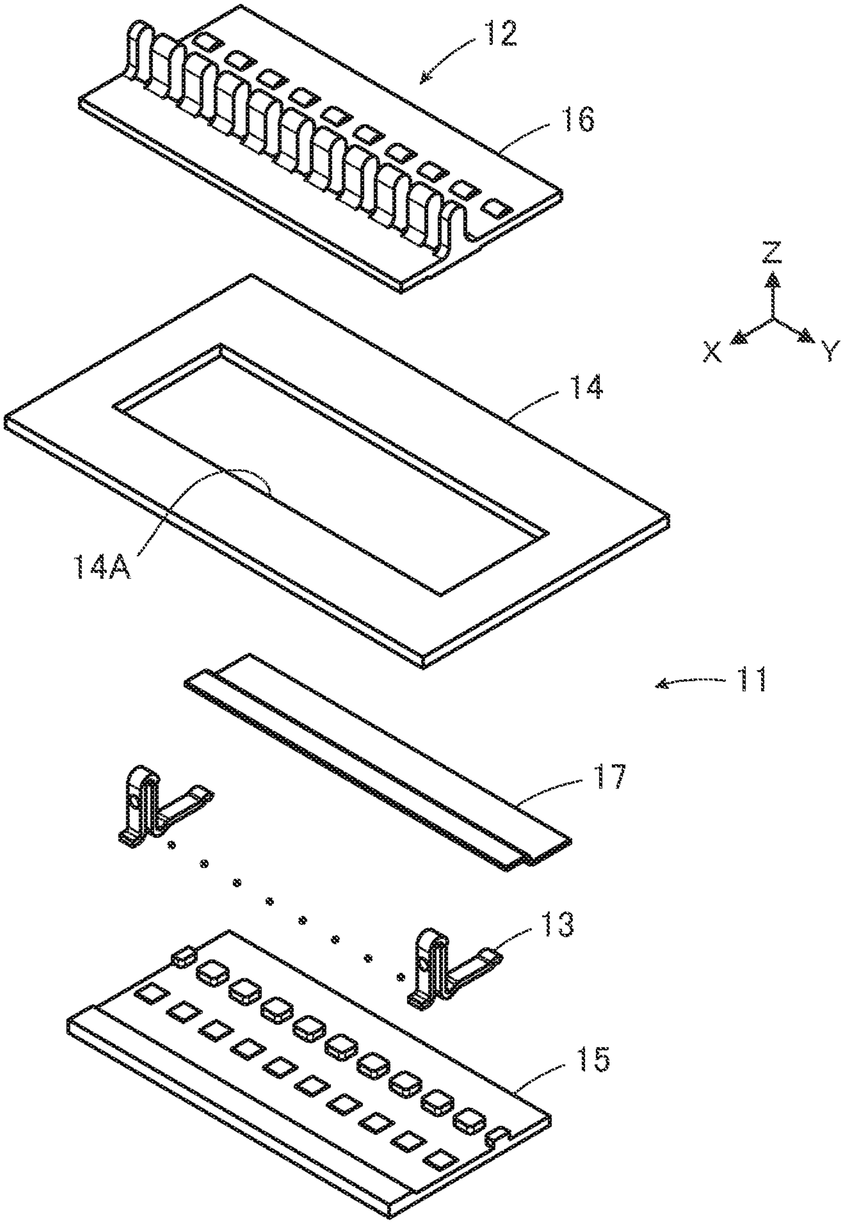
FIG. 2 is an exploded perspective view of a first connector in Embodiment 1.

FIG. 2 is an exploded perspective view of the first connector 11. The first connector 11 includes a bottom insulator 15 and a top insulator 16, and these bottom and top insulators 15 and 16 constitute the first insulator 12.

The plurality of first contacts 13 are disposed on the +Z direction side from the bottom insulator 15, and a circuit board 17 is disposed on the +Z direction side from the plurality of first contacts 13. Further, the tab sheet 14 is disposed on the +Z direction side from the circuit board 17, and the top insulator 16 is disposed on the +Z direction side from the tab sheet 14.

The tab sheet 14 is made of, for instance, cloth of a garment to which the first connector 11 is to be attached as the garment-side connector, and the tab sheet 14 has a rectangular opening 14A.

Figure 3:
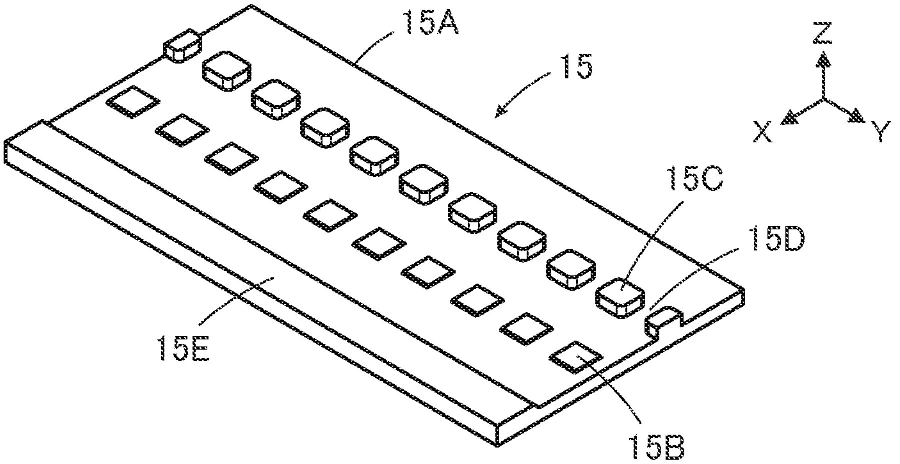
FIG. 3 is a perspective view showing a bottom insulator used in the first connector in Embodiment 1.

As shown in FIG. 3, the bottom insulator 15 includes a flat plate portion 15A extending along an XY plane, and a plurality of contact supporting portions 15B of protrusion shape are formed to be aligned in the Y direction on the top surface, facing the +Z direction, of the flat plate portion 15A. In addition, a plurality of projections 15C are formed to be aligned in the Y direction on the top surface, facing the +Z direction, of the flat plate portion 15A on the −X direction side from the plurality of contact supporting portions 15B. A plurality of contact insertion portions 15D are each formed by a gap between adjacent projections 15C.

The plurality of contact insertion portions 15D are situated at the same Y-directional positions as the plurality of contact supporting portions 15B, and the plurality of contact supporting portions 15B and the plurality of contact insertion portions 15D correspond to the plurality of first contacts 13.

The flat plate portion 15A is provided at its +X directional end with a tab sheet supporting portion 15E extending in the Y direction and protruding in the +Z direction.

Figure 4:
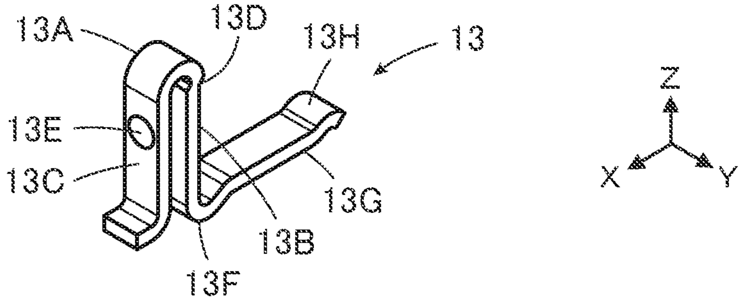
FIG. 4 is a perspective view showing a first contact used in the first connector in Embodiment 1.

As shown in FIG. 4, the first contact 13 is formed from a band-shaped plate member that is made of a conductive material such as metal and that is bent, and the first contact 13 includes a retention projection 13A bent in a U shape and extending in the Z direction. The retention projection 13A has a lateral surface 13B facing the −X direction and a lateral surface 13C facing the +X direction, and the lateral surface 13B is provided at its +Z directional end with a hook portion 13D protruding in a right angle shape or a chevron shape and facing the −X direction and the −Z direction. The lateral surface 13C is provided with a protrusion portion 13E protruding in the +X direction on the −Z direction side from the hook portion 13D at a position closer to the base portion of the retention projection 13A than the hook portion 13D is.

The −Z directional end of the lateral surface 13B is provided with a bent portion 13F protruding in the −Z direction. A cantilever portion 13G extends in the −X direction from the bent portion 13F. The −X directional end of the cantilever portion 13G is provided with a curved portion 13H curving in a convex shape toward the +Z direction.

Figure 5:
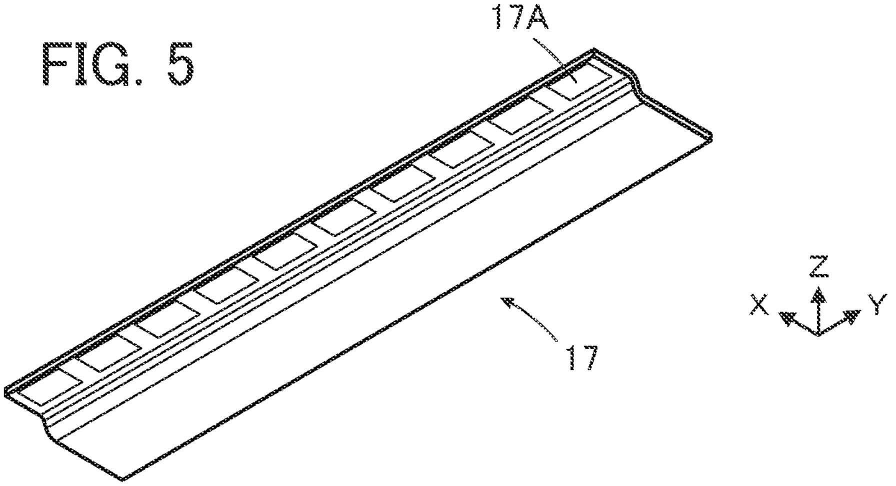
FIG. 5 is a perspective view of a circuit board used in the first connector in Embodiment 1, as viewed from an obliquely lower position.

As shown in FIG. 5, the circuit board 17 is constituted of, for example, a so-called flexible printed circuit (FPC), and a plurality of connection portions 17A aligned in the Y direction are exposed on the bottom surface, facing the −Z direction, of the circuit board 17 at the +X directional end of the circuit board 17. The plurality of connection portions 17A correspond to the plurality of first contacts 13.

Figure 6:
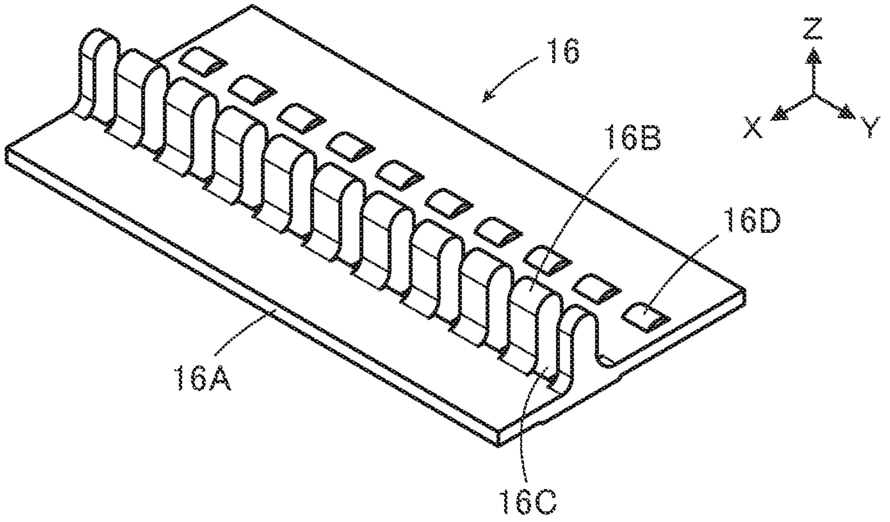
FIG. 6 is a perspective view showing a top insulator used in the first connector in Embodiment 1.
Figure 7:
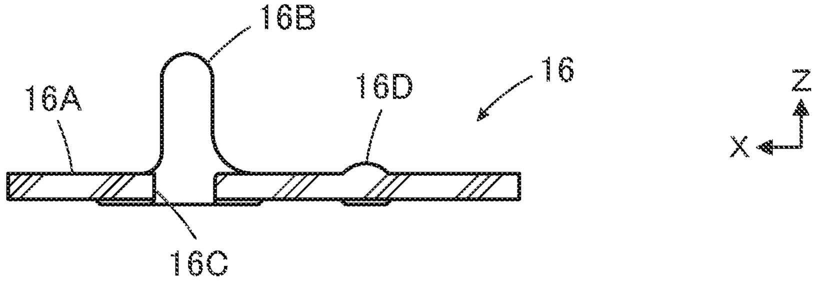
FIG. 7 is a cross-sectional view showing the top insulator used in the first connector in Embodiment 1.

As shown in FIG. 6, the top insulator 16 includes a flat plate portion 16A extending along an XY plane, and a plurality of projections 16B aligned in the Y direction and projecting in the +Z direction are formed on the top surface, facing the +Z direction, of the flat plate portion 16A. A plurality of through-holes 16C penetrating the flat plate portion 16A in the Z direction as shown in FIG. 7 are each formed between adjacent projections 16B. In addition, a plurality of protuberance portions 16D aligned in the Y direction and projecting in the +Z direction are formed on the top surface, facing the +Z direction, of the flat plate portion 16A on the −X direction side from the plurality of projections 16B.

The plurality of protuberance portions 16D are situated at the same Y-directional positions as the plurality of through-holes 16C, and the plurality of through-holes 16C and the plurality of protuberance portions 16D correspond to the plurality of first contacts 13.

Figure 8:
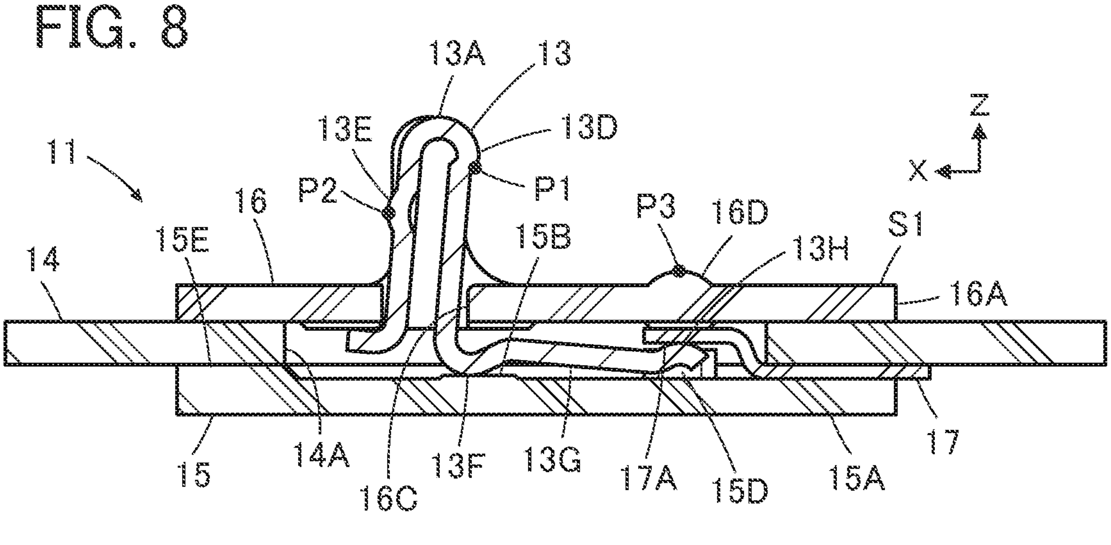
FIG. 8 is a cross-sectional view showing the first connector in Embodiment 1.

When the first connector 11 is assembled, as shown in FIG. 8, the retention projection 13A of the first contact 13 is inserted into the corresponding through-hole 16C of the top insulator 16 from the −Z direction within the opening 14A of the tab sheet 14, and the tab sheet 14 and the circuit board 17 are sandwiched between the flat plate portion 15A of the bottom insulator 15 and the flat plate portion 16A of the top insulator 16 such that the connection portion 17A of the circuit board 17 is situated on the +Z direction side of the curved portion 13H of the corresponding first contact 13. In this state, the bottom insulator 15 and the top insulator 16 are fixed to each other.

The bottom insulator 15 and the top insulator 16 may be fixed to each other by being adhered to the tab sheet 14 and the circuit board 17, or alternatively by another method, e.g., by inserting a boss formed to project on one of the bottom insulator 15 and the top insulator 16 into a through-hole formed in the other thereof and deforming the tip of the boss by heat.

As shown in FIG. 8, the first contact 13 is retained by the bottom insulator 15 and the top insulator 16 with the bent portion 13F being situated on the contact supporting portion 15B of the bottom insulator 15, the −X directional end of the cantilever portion 13G being inserted in the contact insertion portion 15D of the bottom insulator 15, and the curved portion 13H being in contact with the connection portion 17A of the circuit board 17.

While the first contact 13 does not have a fixation portion fixed to the bottom insulator 15 and the top insulator 16, a part of the first contact 13 may be fixed to one of the bottom insulator 15 and the top insulator 16.

In the first connector 11 configured as above, the top surface, facing the +Z direction, of the flat plate portion 16A of the top insulator 16 forms a first exposed surface S1 facing the second connector 21, and the retention projection 13A of the first contact 13 projects in the +Z direction from the first exposed surface S1.

In addition, a first contacting portion P1 facing the −X direction and the −Z direction is set by the hook portion 13D of the first contact 13, a second contacting portion P2 facing the +X direction and situated on the −Z direction side from the first contacting portion P1 is set by the protrusion portion 13E of the first contact 13, and a third contacting portion P3 situated on the first exposed surface S1 at a position away from the first contacting portion P1 in the −X direction and facing the +Z direction is set by the protuberance portion 16D of the top insulator 16.

The second connector 21 is retained with respect to the first connector 11 owing to the first contacting portion P1, the second contacting portion P2, and the third contacting portion P3 making contact with the second connector 21.

Figure 9:
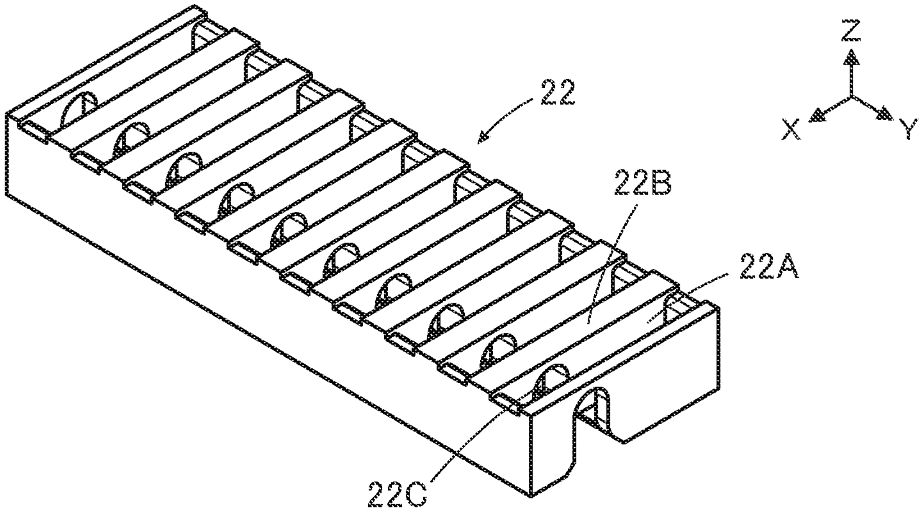
FIG. 9 is a perspective view showing a second insulator used in a second connector in Embodiment 1.

As shown in FIG. 9, the second insulator 22 has a rectangular cuboid outer shape and includes a plurality of contact accommodating portions 22A of recess shape aligned in the Y direction and each extending in the X direction and the Z direction. A partition plate 22B extending along an XZ plane is formed between adjacent contact accommodating portions 22A.

Each partition plate 22B is provided with a U-shaped cutout 22C opening toward the −Z direction.

Figure 10:
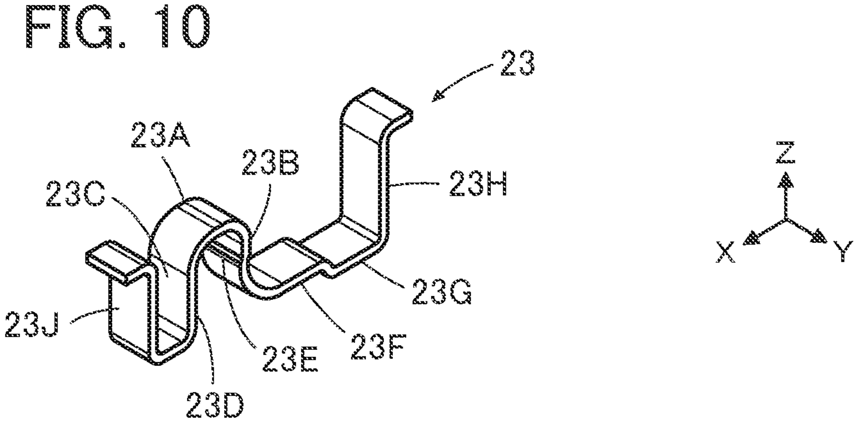
FIG. 10 is a perspective view showing a second contact used in the second connector in Embodiment 1.

As shown in FIG. 10, the second contact 23 is formed from a band-shaped plate member that is made of a conductive material such as metal and that is bent, and the second contact 23 includes a U-shaped portion 23A curved in a U shape opening toward the −Z direction. The U-shaped portion 23A includes a first extension portion 23B extending along a YZ plane on the −X direction side and a second extension portion 23C extending along a YZ plane on the +X direction side. A projection accommodating portion 23D of recess shape is formed inside the U-shaped portion 23A to accommodate the retention projection 13A of the first contact 13. The surface, on the +X direction side, of the first extension portion 23B facing the projection accommodating portion 23D is provided with a receiving portion 23E formed by a concavity for receiving the hook portion 13D of the first contact 13.

The second contact 23 has a bottom portion 23F extending in the −X direction from the −Z directional end of the first extension portion 23B. The bottom portion 23F is provided with a step portion 23G that goes down in the −Z direction, and a rising portion 23H is formed to rise in the +Z direction from the −X directional end of the step portion 23G. The second contact 23 further has a rising portion 23J bent toward the +X direction from the −Z directional end of the second extension portion 23C and rising in the +Z direction.

Figure 11:
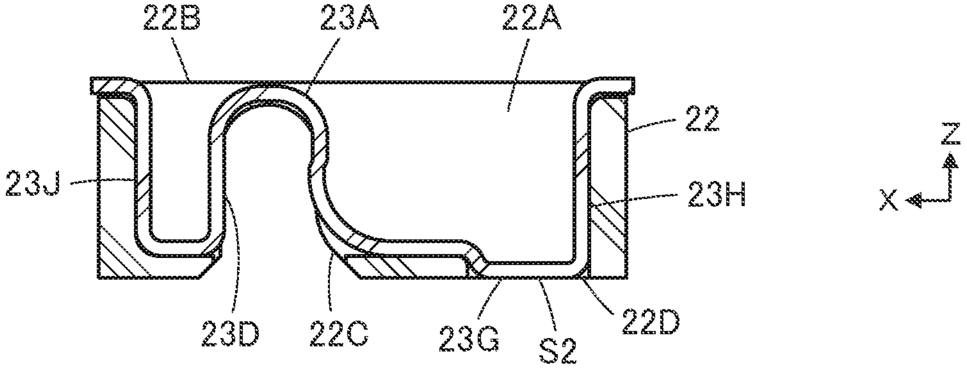
FIG. 11 is a cross-sectional view showing the second connector in Embodiment 1.

As shown in FIG. 11, the second contact 23 is accommodated in the contact accommodating portion 22A of the second insulator 22 from the +Z direction. The rising portions 23H and 23J of the second contact 23 are respectively pressed against the inner surfaces of the −X and +X directional ends of the contact accommodating portion 22A, so that the second contact 23 is retained in the second insulator 22.

The contact accommodating portion 22A of the second insulator 22 is provided with a through-hole 22D penetrating in the Z direction. The step portion 23G of the second contact 23 is inserted in the through-hole 22D, whereby the bottom surface, facing the −Z direction, of the step portion 23G forms the substantially same plane as the bottom surface, on the −Z direction side, of the second insulator 22, and those bottom surfaces together form a second exposed surface S2 facing the −Z direction.

The projection accommodating portion 23D formed inside the U-shaped portion 23A of the second contact 23 is situated to overlap the cutout 22C formed in the partition plate 22B of the second insulator 22 as viewed from the Y direction.

Figure 12:
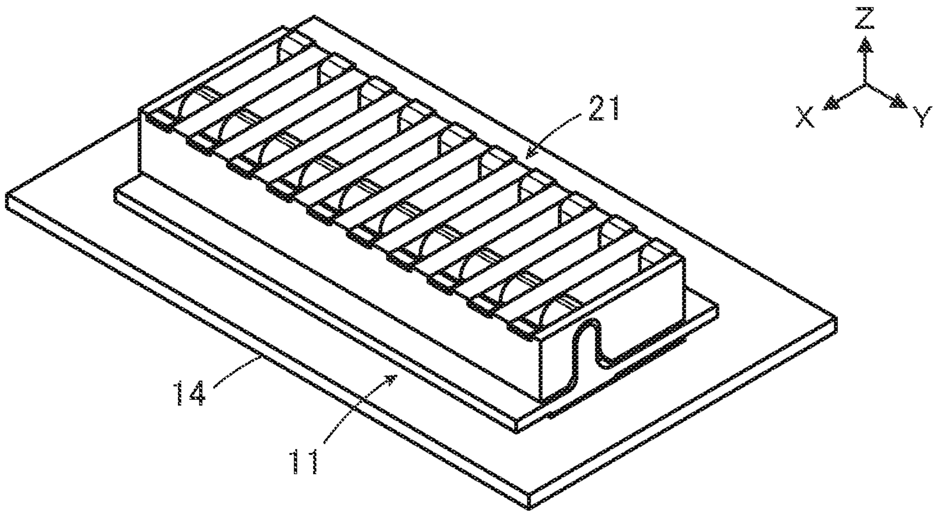
FIG. 12 is a perspective view showing the connector assembly of Embodiment 1 in a fitting state.

From the state where the second connector 21 is disposed on the +Z direction side from the first connector 11 as shown in FIG. 1, the second connector 21 is moved in the −Z direction and thereby fitted to the first connector 11 as shown in FIG. 12.

Figure 13:
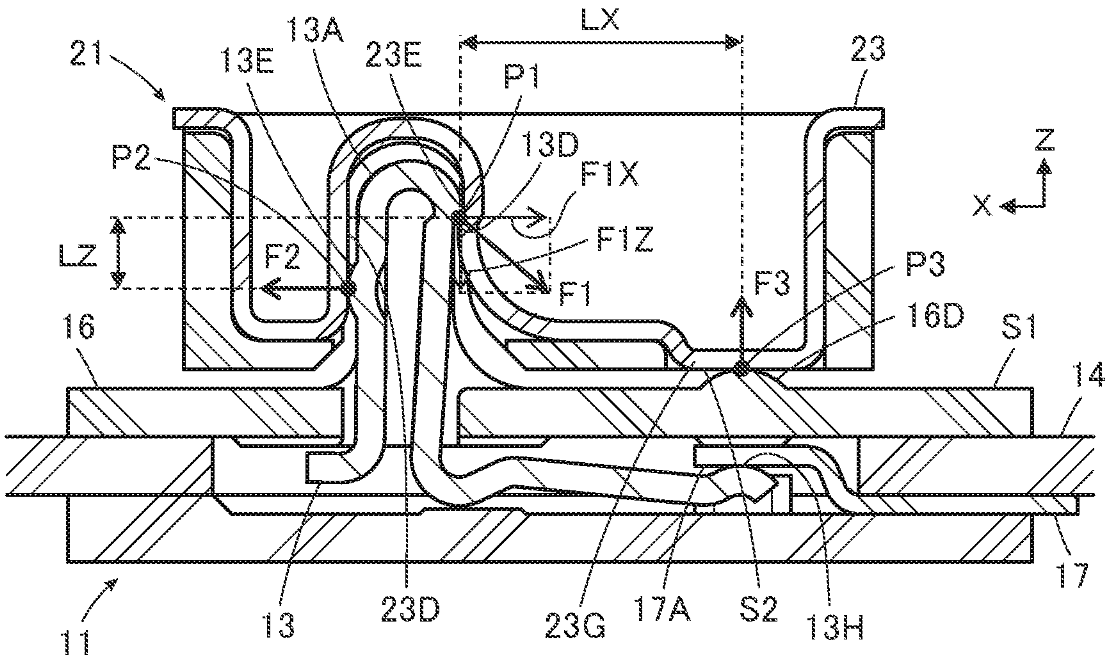
FIG. 13 is a partial cross-sectional view showing the connector assembly of Embodiment 1 in the fitting state.

At this time, as shown in FIG. 13, a +Z directional portion of the retention projection 13A of the first contact 13 of the first connector 11 is inserted into the projection accommodating portion 23D of the second contact 23 of the second connector 21 from the −Z direction, the hook portion 13D of the retention projection 13A is received by the receiving portion 23E of the second contact 23, and the protrusion portion 13E of the retention projection 13A makes contact with the inner surface, on the +X direction side, of the projection accommodating portion 23D of the second contact 23.

Further, the protuberance portion 16D formed on the first exposed surface S1 of the top insulator 16 of the first connector 11 makes contact with the bottom surface of the step portion 23G of the second contact 23 which bottom surface forms the second exposed surface S2 of the second connector 21.

As a consequence, the second contact 23 of the second connector 21 receives a force F1 acting in the −X direction and the −Z direction from the first contacting portion P1 set at the hook portion 13D of the retention projection 13A of the first contact 13 of the first connector 11, a force F2 acting in the +X direction from the second contacting portion P2 set at the protrusion portion 13E of the retention projection 13A of the first contact 13 of the first connector 11, and a force F3 acting in the +Z direction from the third contacting portion P3 set at the protuberance portion 16D of the top insulator 16 of the first connector 11.

The inner surface of the projection accommodating portion 23D of the second contact 23 receives the force F1 and the force F2 separately from the first contacting portion P1 and the second contacting portion P2 of the retention projection 13A of the first contact 13, whereby the first contact 13 is electrically connected to the second contact 23.

In addition, the curved portion 13H of the first contact 13 makes contact with the connection portion 17A of the circuit board 17, so that the first contact 13 is electrically connected to the connection portion 17A of the circuit board 17; thus, the second contact 23 is electrically connected to the connection portion 17A of the circuit board 17 via the first contact 13 in the fitting state between the first connector 11 and the second connector 21.

Now, when a frictional force between the first contact 13 and the second contact 23 and the gravity acting on the second connector 21 are ignored, and when it is assumed that the three forces F1, F2, and F3 balance, the following relationships hold:

$$F2=F1X \tag{1}$$

$$F3=F1Z \tag{2}$$

where a component force of the force F1 in the X direction is F1X, and a component force of the force F1 in the Z direction is F1Z. It should be noted that F1, F2, F3, F1X, and F1Z are expressed in their absolute values.

Further, from the moments balancing about the first contacting portion P1, the following relationship holds:

$$(F2\times LZ)=(F3\times LX) \tag{3}$$

where the distance between the first contacting portion P1 and the third contacting portion P3 in the X direction is LX, and the distance between the first contacting portion P1 and the second contacting portion P2 in the Z direction is LZ.

From Formulae (1), (2), and (3) above, the following formula holds:

$$(F3/F2)=(F1Z/F1X)=(LZ/LX) \tag{4}$$

Figure 14:
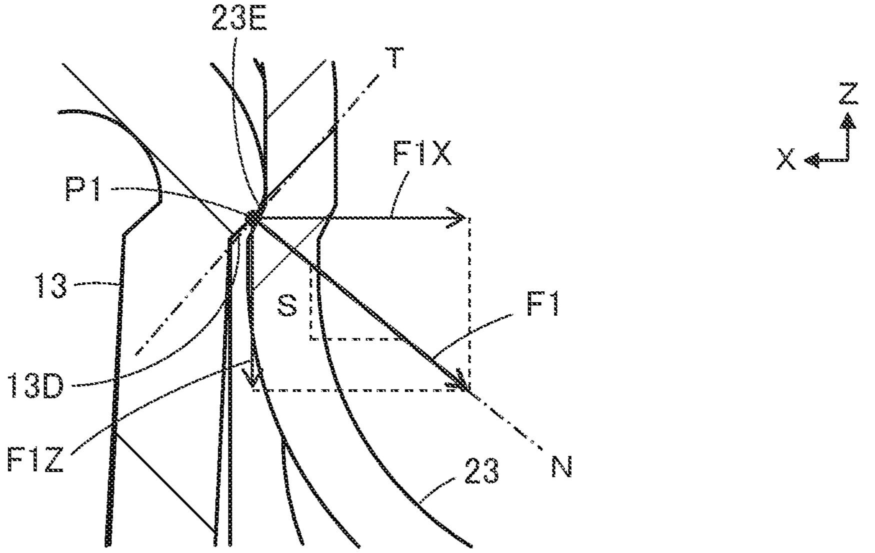
FIG. 14 is an enlarged view of an important part of FIG. 13.

As shown in FIG. 14, when the hook portion 13D of the first contact 13 is received by the receiving portion 23E of the second contact 23, a tangent plane formed by the hook portion 13D and the receiving portion 23E contacting each other is represented by T, and a normal line perpendicular to the tangent plane T by N. If a frictional force acting between the first contact 13 and the second contact 23 is ignored, the force F1 along the normal line N acts from the first contacting portion P1 set at the hook portion 13D to the receiving portion 23E of the second contact 23.

That is, the ratio of the component force F1Z of the force F1 in the Z direction to the component force F1X of the force F1 in the X direction (F1Z/F1X) is to be equal to an incline S of the normal line N.

In this manner, in the state where the forces F1, F2, and F3 acting on the second contact 23 balance and the moments balance, the second contact 23 is supported at three points by the first contacting portion P1, the second contacting portion P2, and the third contacting portion P3.

Thus, the second connector 21 receives the forces F1 acting in the −X direction and the −Z direction from the first contacting portions P1 of the plurality of first contacts 13 of the first connector 11, the forces F2 acting in the +X direction from the second contacting portions P2 thereof, and the forces F3 acting in the +Z direction from the third contacting portions P3 of the plurality of protuberance portions 16D of the top insulator 16.

A resultant force of those forces F1, a resultant force of those forces F2, and a resultant force of those forces F3 balance, and the moments balance; therefore, the second connector 21 is stably supported with respect to the first connector 11, and the fitting state of the second connector 21 with respect to the first connector 11 is maintained.

Now, it is assumed that, in place of the first connector 11, use is made of, for example, a first connector identical to the first connector 11 except that the protuberance portion 16D on the first exposed surface S1 of the top insulator 16 is positioned off to the −X direction side compared to that of the first connector 11.

The position of the protuberance portion 16D off to the −X direction side results in a longer distance LX between the first contacting portion P1 and the third contacting portion P3 in the X direction; consequently, based on Formula (3) above, the force F3 in the +Z direction acting from the third contacting portion P3 to the second connector 21 decreases in an attempt to balance the moments about the first contacting portion P1, and the component force F1Z of the force F1 in the Z direction decreases accordingly. On the other hand, since the component force F1X of the force F1 in the X direction is equal to the force F2 and is unchanged, the ratio (F1Z/F1X) tends to be smaller than the incline S of the normal line N.

However, when a frictional force is ignored, the force F1 along the normal line N acts from the first contacting portion P1 as a normal force from the tangent plane T, and a force acting in the −Z direction corresponding to the decrease of the component force F1Z of the force F1 in the Z direction is to act from the first contacting portion P1 to the second connector 21. As a result, the second connector 21 is prevented from coming off the first connector in the +Z direction.

Next, it is assumed that, in place of the first connector 11, use is made of, for example, a first connector identical to the first connector 11 except that the protuberance portion 16D on the first exposed surface S1 of the top insulator 16 is positioned off to the +X direction side compared to that of the first connector 11.

The position of the protuberance portion 16D off to the +X direction side results in a shorter distance LX between the first contacting portion P1 and the third contacting portion P3 in the X direction; consequently, based on Formula (3) above, the force F3 in the +Z direction acting from the third contacting portion P3 to the second connector 21 increases in an attempt to balance the moments about the first contacting portion P1, and the component force F1Z of the force F1 in the Z direction increases accordingly. On the other hand, since the component force F1X of the force F1 in the X direction is equal to the force F2 and is unchanged, the ratio (F1Z/F1X) tends to be greater than the incline S of the normal line N.

However, when a frictional force is ignored, the force F1 along the normal line N acts from the first contacting portion P1 as a normal force from the tangent plane T, and a force acting in the +Z direction corresponding to the increase of the component force F1Z of the force F1 in the Z direction is to act from the first contacting portion P1 to the second connector 21. Hence, the second connector 21 easily comes off the first connector in the +Z direction.

That is to say, to stably support the second connector 21 at three points with respect to the first connector 11, the ratio LZ/LX of the distance LZ between the first contacting portion P1 and the second contacting portion P2 in the Z direction to the distance LX between the first contacting portion P1 and the third contacting portion P3 in the X direction is desired to be not greater than the incline S of the normal line N with respect to the X direction, the normal line being perpendicular to the tangent plane T formed by the hook portion 13D and the receiving portion 23E contacting each other when the hook portion 13D of the retention projection 13A is received by the receiving portion 23E of the second contact 23.

Even when an unignorable frictional force acts between the first contact 13 and the second contact 23, the second connector 21 can be stably supported with respect to the first connector 11 by having the ratio LZ/LX that is not greater than the incline S of the normal line N.

Besides, even when the gravity acting on the second connector 21 is considered, the forces F1, F2, and F3 acting on the plurality of second contacts 23 of the second connector 21 balance with the gravity acting on the second connector 21, and the moments balance, so that the second connector 21 is stably supported with respect to the first connector 11, and the fitting state of the second connector 21 with respect to the first connector 11 is maintained.

Thus, the connector assembly of Embodiment 1 makes it possible to stably maintain the fitting state between the first connector 11 and the second connector 21 and connect the second contacts 23 of the second connector 21 to the connection portions 17A of the circuit board 17 with a simple structure without the use of a dedicated mechanism for locking the fitting state.

Embodiment 2

Figure 15:
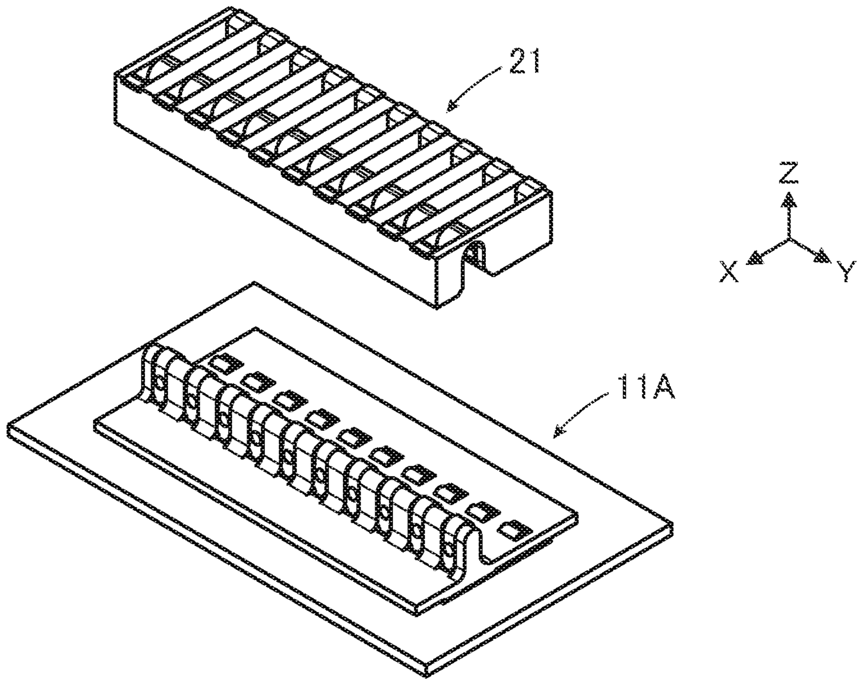
FIG. 15 is a perspective view showing a connector assembly of Embodiment 2 before fitting.

FIG. 15 shows a connector assembly according to Embodiment 2 before fitting. This connector assembly is obtained by using a first connector 11A in place of the first connector 11 in the connector assembly of Embodiment 1, and the second connector 21 used in Embodiment 1 is fitted to the first connector 11A.

Figure 16:
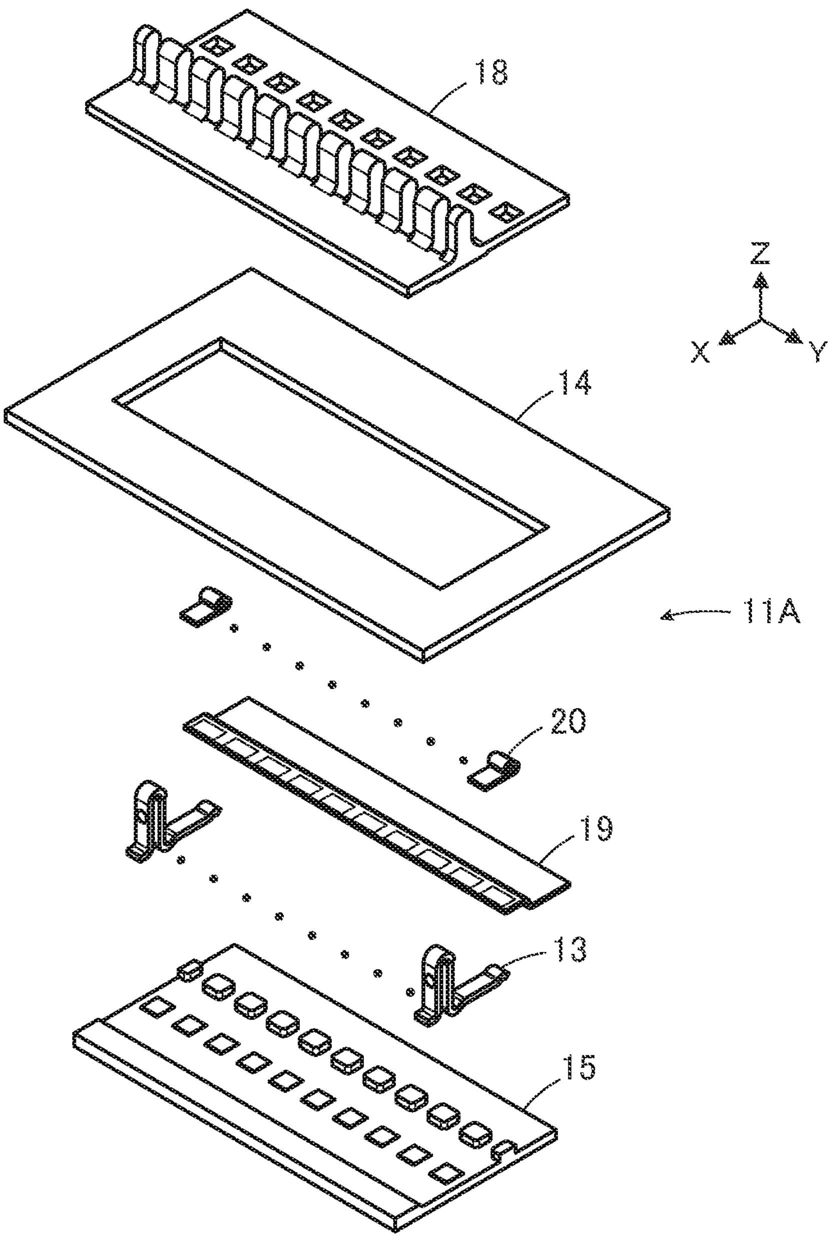
FIG. 16 is an exploded perspective view of a first connector in Embodiment 2.

As shown in FIG. 16, the first connector 11A includes the bottom insulator 15 and a top insulator 18. The plurality of first contacts 13 are disposed on the +Z direction side from the bottom insulator 15, and a circuit board 19 is disposed on the +Z direction side from the plurality of first contacts 13. Further, a plurality of auxiliary contacts 20 are disposed on the +Z direction side from the circuit board 19, the tab sheet 14 is disposed on the +Z direction side from the plurality of auxiliary contacts 20, and the top insulator 18 is disposed on the +Z direction side from the tab sheet 14. The plurality of auxiliary contacts 20 correspond to the plurality of first contacts 13.

The first contacts 13, the tab sheet 14, and the bottom insulator 15 herein are identical to those used in Embodiment 1 and shown in FIGS. 4, 2, and 3, respectively.

Figure 17:
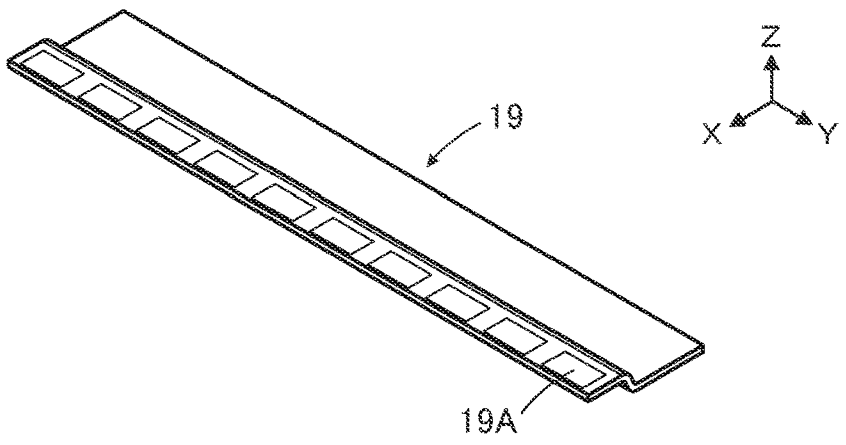
FIG. 17 is a perspective view showing a circuit board used in the first connector in Embodiment 2.

As shown in FIG. 17, the circuit board 19 is constituted of, for example, a so-called flexible printed circuit (FPC), and a plurality of connection portions 19A aligned in the Y direction are exposed on the top surface, facing the +Z direction, of the circuit board 19 at the +X directional end of the circuit board 19. The plurality of connection portions 19A correspond to the plurality of first contacts 13.

Figure 18:
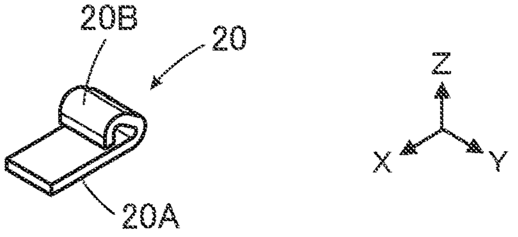
FIG. 18 is a perspective view showing an auxiliary contact used in the first connector in Embodiment 2.

As shown in FIG. 18, the auxiliary contact 20 is formed from a band-shaped plate member that is made of a conductive material such as metal and that is bent, and the auxiliary contact 20 includes a base portion 20A extending along an XY plane and a curved portion 20B joined to the −X directional end of the base portion 20A and curved to form a protrusion protruding in the +Z direction.

Figure 19:
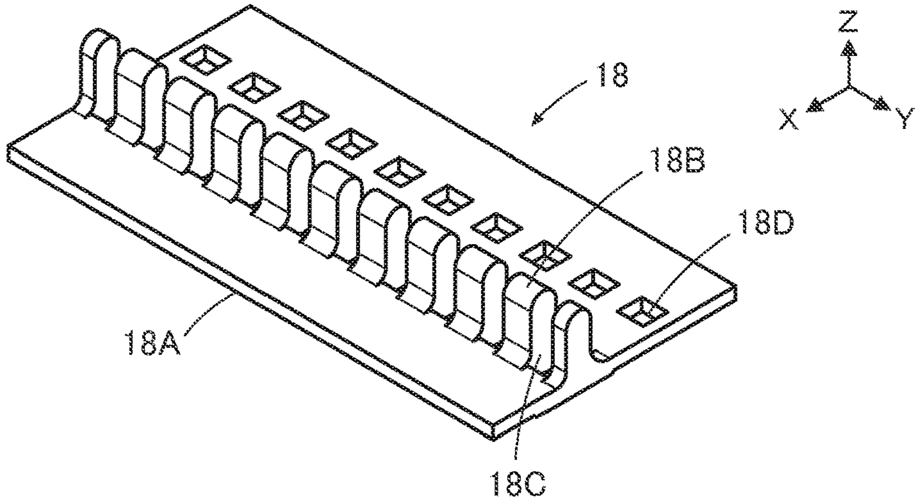
FIG. 19 is a perspective view showing a top insulator used in the first connector in Embodiment 2.
Figure 20:
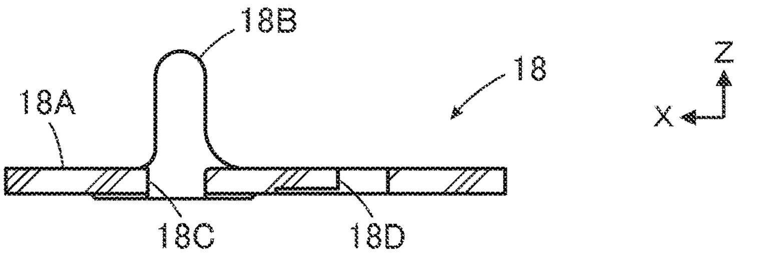
FIG. 20 is a cross-sectional view showing the top insulator used in the first connector in Embodiment 2.

As shown in FIG. 19, the top insulator 18 includes a flat plate portion 18A extending along an XY plane, and a plurality of projections 18B aligned in the Y direction and projecting in the +Z direction are formed on the top surface, facing the +Z direction, of the flat plate portion 18A. A plurality of through-holes 18C penetrating the flat plate portion 18A in the Z direction as shown in FIG. 20 are each formed between adjacent projections 18B. In addition, a plurality of through-holes 18D aligned in the Y direction and penetrating the flat plate portion 18A in the Z direction are formed at the top surface, facing the +Z direction, of the flat plate portion 18A on the −X direction side from the plurality of projections 18B.

The plurality of through-holes 18D are situated at the same Y-directional positions as the plurality of through-holes 18C, and the plurality of through-holes 18C and the plurality of through-holes 18D correspond to the plurality of first contacts 13.

Figure 21:
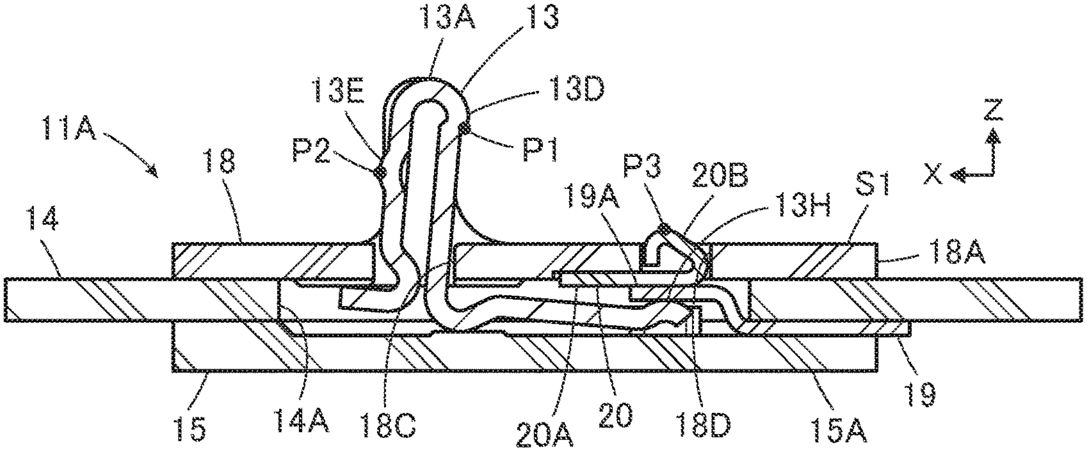
FIG. 21 is a cross-sectional view showing the first connector in Embodiment 2.

When the first connector 11A is assembled, as shown in FIG. 21, the retention projection 13A of the first contact 13 is inserted into the corresponding through-hole 18C of the top insulator 18 from the −Z direction within the opening 14A of the tab sheet 14, and the tab sheet 14 and the circuit board 19 are sandwiched between the flat plate portion 15A of the bottom insulator 15 and the flat plate portion 18A of the top insulator 18 such that the +X directional end of the circuit board 19 is situated on the +Z direction side of the curved portion 13H of the first contact 13 and that the base portion 20A of the auxiliary contact 20 makes contact with the bottom surface of the flat plate portion 18A of the top insulator 18 while the curved portion 20B is inserted into the corresponding through-hole 18D of the top insulator 18. In this state, the bottom insulator 15 and the top insulator 18 are fixed to each other.

The base portion 20A of the auxiliary contact 20 is in contact with the corresponding connection portion 19A of the circuit board 19.

In the first connector 11A configured as above, the top surface, facing the +Z direction, of the flat plate portion 18A of the top insulator 18 forms a first exposed surface S1 facing the second connector 21, and the retention projection 13A of the first contact 13 projects in the +Z direction from the first exposed surface S1.

In addition, a first contacting portion P1 facing the −X direction and the −Z direction is set by the hook portion 13D of the first contact 13, a second contacting portion P2 facing the +X direction and situated on the −Z direction side from the first contacting portion P1 is set by the protrusion portion 13E of the first contact 13, and a third contacting portion P3 situated on the first exposed surface S1 at a position away from the first contacting portion P1 in the −X direction and facing the +Z direction is set by the curved portion 20B of the auxiliary contact 20.

The second connector 21 is retained with respect to the first connector 11A owing to the first contacting portion P1, the second contacting portion P2, and the third contacting portion P3 making contact with the second connector 21.

Figure 22:
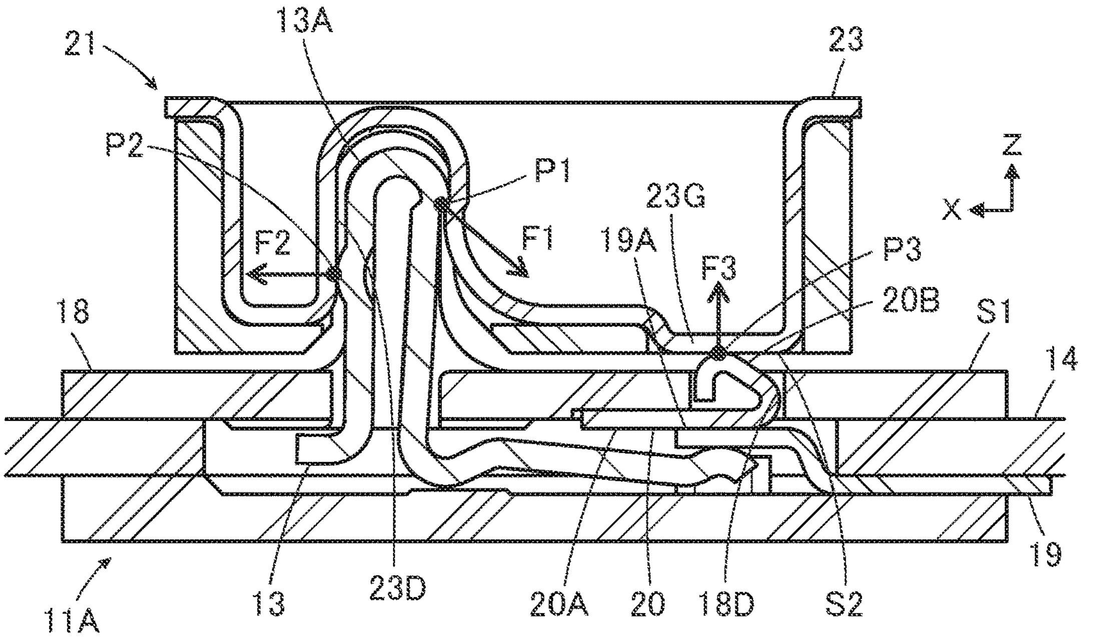
FIG. 22 is a partial cross-sectional view showing the connector assembly of Embodiment 2 in a fitting state.

From the state where the second connector 21 is disposed on the +Z direction side from the first connector 11A as shown in FIG. 15, the second connector 21 is moved in the −Z direction and thereby fitted to the first connector 11A as shown in FIG. 22.

At this time, a +Z directional portion of the retention projection 13A of the first contact 13 of the first connector 11A is inserted into the projection accommodating portion 23D of the second contact 23 of the second connector 21 from the −Z direction, and the second contact 23 of the second connector 21 receives a force F1 acting in the −X direction and the −Z direction from the first contacting portion P1 set at the first contact 13 of the first connector 11A and a force F2 acting in the +X direction from the second contacting portion P2, as with Embodiment 1.

Further, the curved portion 20B of the auxiliary contact 20 projecting on the first exposed surface S1 through the through-hole 18D of the top insulator 18 of the first connector 11A makes contact with the bottom surface of the step portion 23G of the second contact 23 which bottom surface forms the second exposed surface S2 of the second connector 21. Thus, the second contact 23 receives a force F3 acting in the +Z direction from the third contacting portion P3 set at the curved portion 20B.

In this manner, the second connector 21 receives the forces F1 acting in the −X direction and the −Z direction from the first contacting portions P1 of the plurality of first contacts 13 of the first connector 11A, the forces F2 acting in the +X direction from the second contacting portions P2 thereof, and the forces F3 acting in the +Z direction from the third contacting portions P3 of the plurality of auxiliary contacts 20.

A resultant force of those forces F1, a resultant force of those forces F2, and a resultant force of those forces F3 balance, and the moments balance; therefore, the second connector 21 is stably supported with respect to the first connector 11A, and the fitting state of the second connector 21 with respect to the first connector 11A is maintained.

The first contacting portion P1 and the second contacting portion P2 of the retention projection 13A of the first contact 13 make contact with the inner surface of the projection accommodating portion 23D of the second contact 23, whereby the first contact 13 is electrically connected to the second contact 23.

In addition, the base portion 20A of the auxiliary contact 20 makes contact with the corresponding connection portion 19A of the circuit board 19, and the curved portion 20B makes contact with the bottom surface of the step portion 23G of the second contact 23, so that the auxiliary contact 20 is electrically connected to the connection portion 19A of the circuit board 19; thus, the second contact 23 is electrically connected to the connection portion 19A of the circuit board 19 via the auxiliary contact 20 in the fitting state between the first connector 11A and the second connector 21.

Thus, also in Embodiment 2, it is possible to stably maintain the fitting state between the first connector 11A and the second connector 21 and connect the second contacts 23 of the second connector 21 to the connection portions 19A of the circuit board 19 with a simple structure without the use of a dedicated mechanism for locking the fitting state, as with Embodiment 1.

Embodiment 3

Figure 23:
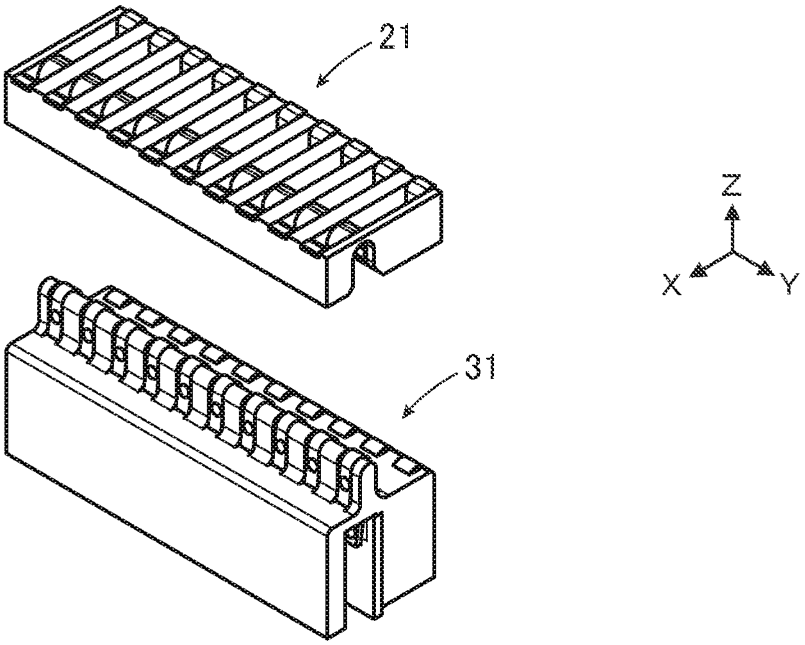
FIG. 23 is a perspective view showing a connector assembly of Embodiment 3 before fitting.

FIG. 23 shows a connector assembly according to Embodiment 3 before fitting. This connector assembly is obtained by using a first connector 31 in place of the first connector 11 in the connector assembly of Embodiment 1, and the second connector 21 used in Embodiment 1 is fitted to the first connector 31.

Figure 24:
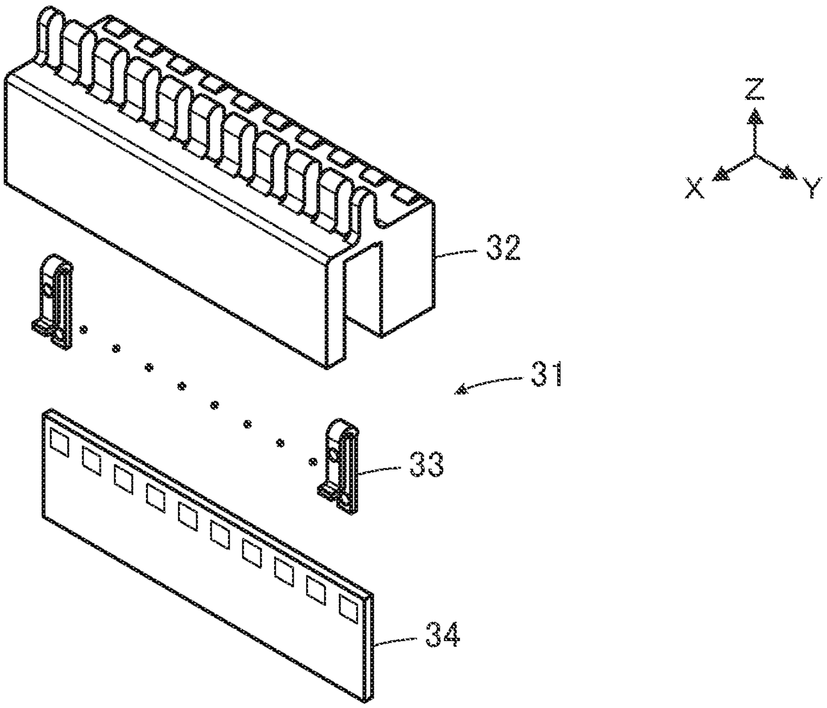
FIG. 24 is an exploded perspective view of a first connector in Embodiment 3.

As shown in FIG. 24, the first connector 31 includes a first insulator 32 made of an insulating material. A plurality of first contacts 33 are disposed on the −Z direction side from the first insulator 32, and a circuit board 34 is disposed on the −Z direction side from the plurality of first contacts 33.

Figure 25:
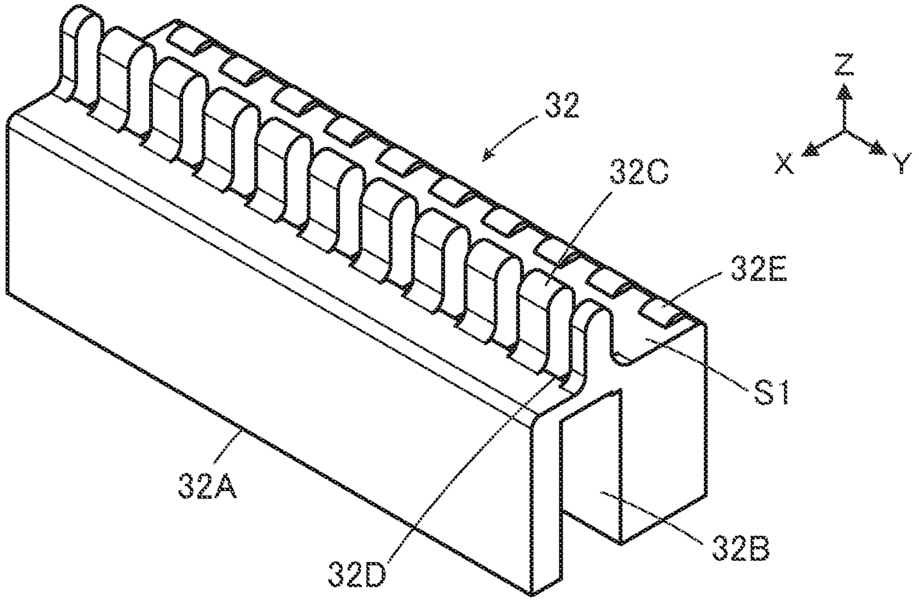
FIG. 25 is a perspective view showing a first insulator used in the first connector in Embodiment 3.

As shown in FIG. 25, the first insulator 32 includes an insulator body 32A of rectangular cuboid shape elongated in the Y direction. The insulator body 32A includes: a groove portion 32B extending in the Y direction over the entire length of the insulator body 32A and opening toward the −Z direction; and a first exposed surface S1 extending along an XY plane and facing the +Z direction.

Figure 26:
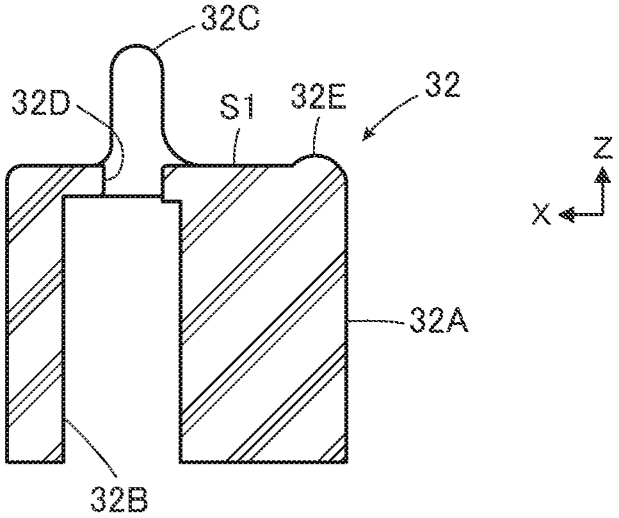
FIG. 26 is a cross-sectional view showing the first insulator used in the first connector in Embodiment 3.

A plurality of projections 32C aligned in the Y direction and projecting in the +Z direction are formed on the first exposed surface S1. A plurality of through-holes 32D are each formed between adjacent projections 32C to penetrate the first exposed surface S1 in the Z direction and communicate with the groove portion 32B as shown in FIG. 26. In addition, the first exposed surface S1 is provided at its −X directional end with a plurality of protuberance portions 32E aligned in the Y direction and projecting in the +Z direction.

The plurality of protuberance portions 32E are situated at the same Y-directional positions as the plurality of through-holes 32D, and the plurality of through-holes 32D and the plurality of protuberance portions 32E correspond to the plurality of first contacts 33.

Figure 27:
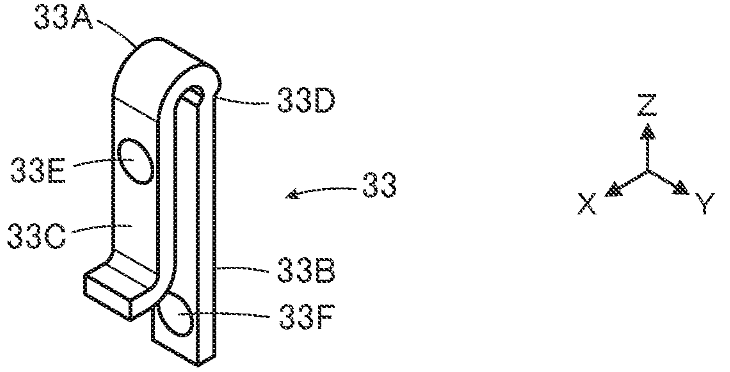
FIG. 27 is a perspective view showing a first contact used in the first connector in Embodiment 3.

As shown in FIG. 27, the first contact 33 is formed from a band-shaped plate member that is made of a conductive material such as metal and that is bent, and the first contact 33 includes a retention projection 33A bent in a U shape and extending in the Z direction. The retention projection 33A has a lateral surface 33B facing the −X direction and a lateral surface 33C facing the +X direction, and the lateral surface 33B is provided at its +Z directional end with a hook portion 33D protruding in a right angle shape or a chevron shape and facing the −X direction and the −Z direction. The lateral surface 33C is provided with a protrusion portion 33E protruding in the +X direction on the −Z direction side from the hook portion 33D at a position closer to the base portion of the retention projection 33A than the hook portion 33D is. The −Z directional end of the lateral surface 33B is provided with a protrusion portion 33F protruding in the −X direction.

Figure 28:
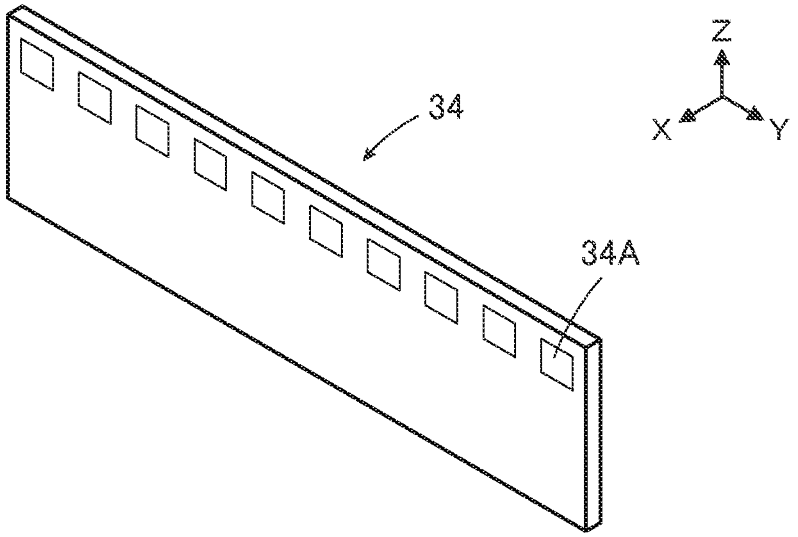
FIG. 28 is a perspective view showing a circuit board used in the first connector in Embodiment 3.

As shown in FIG. 28, the circuit board 34 is constituted of a so-called flexible printed circuit (FPC) that extends along a YZ plane, and a plurality of connection portions 34A aligned in the Y direction are exposed on the surface, facing the +X direction, of the circuit board 34 at the +Z directional end of the circuit board 34. The plurality of connection portions 34A correspond to the plurality of first contacts 33.

Figure 29:
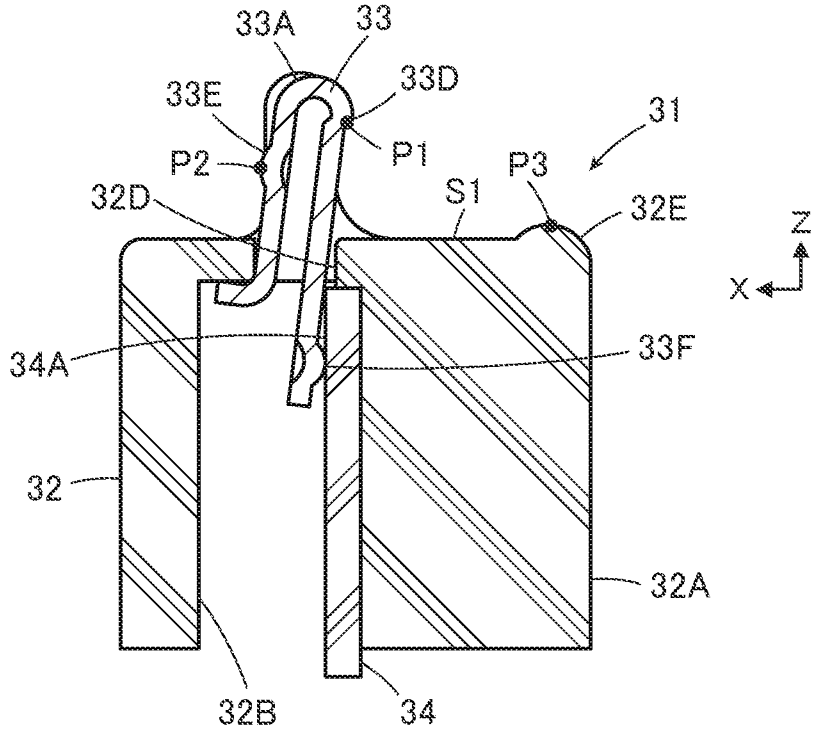
FIG. 29 is a cross-sectional view showing the first connector in Embodiment 3.

When the first connector 31 is assembled, as shown in FIG. 29, the circuit board 34 is inserted into the groove portion 32B of the insulator body 32A from the −Z direction and fixed to the inner surface, on the −X direction side, of the groove portion 32B; subsequently, the plurality of first contacts 33 are inserted into the groove portion 32B of the insulator body 32A from the −Z direction, and the retention projections 33A of the first contacts 33 are inserted into the corresponding through-holes 32D of the insulator body 32A from the −Z direction. As a result, the retention projections 33A of the first contacts 33 project in the +Z direction from the first exposed surface S1 of the insulator body 32A, and the protrusion portions 33F protruding in the −X direction at the −Z directional ends of the first contacts 33 make contact, from the +X direction, with the connection portions 34A exposed at the +Z directional end of the circuit board 34.

In the first connector 31 configured as above, a first contacting portion P1 facing the −X direction and the −Z direction is set by the hook portion 33D of the first contact 33, a second contacting portion P2 facing the +X direction and situated on the −Z direction side from the first contacting portion P1 is set by the protrusion portion 33E of the first contact 33, and a third contacting portion P3 situated on the first exposed surface S1 at a position away from the first contacting portion P1 in the −X direction and facing the +Z direction is set by the protuberance portion 32E of the insulator body 32A.

The second connector 21 is retained with respect to the first connector 31 owing to the first contacting portion P1, the second contacting portion P2, and the third contacting portion P3 making contact with the second connector 21.

Figure 30:
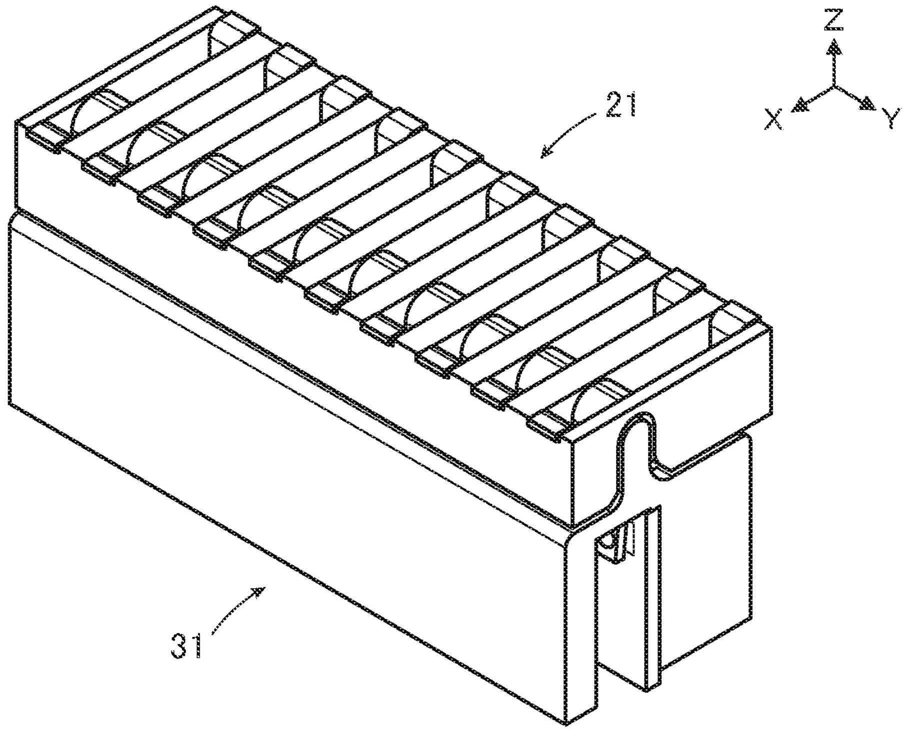
FIG. 30 is a perspective view showing the connector assembly of Embodiment 3 in a fitting state.

From the state where the second connector 21 is disposed on the +Z direction side from the first connector 31 as shown in FIG. 23, the second connector 21 is moved in the −Z direction and thereby fitted to the first connector 31 as shown in FIG. 30.

Figure 31:
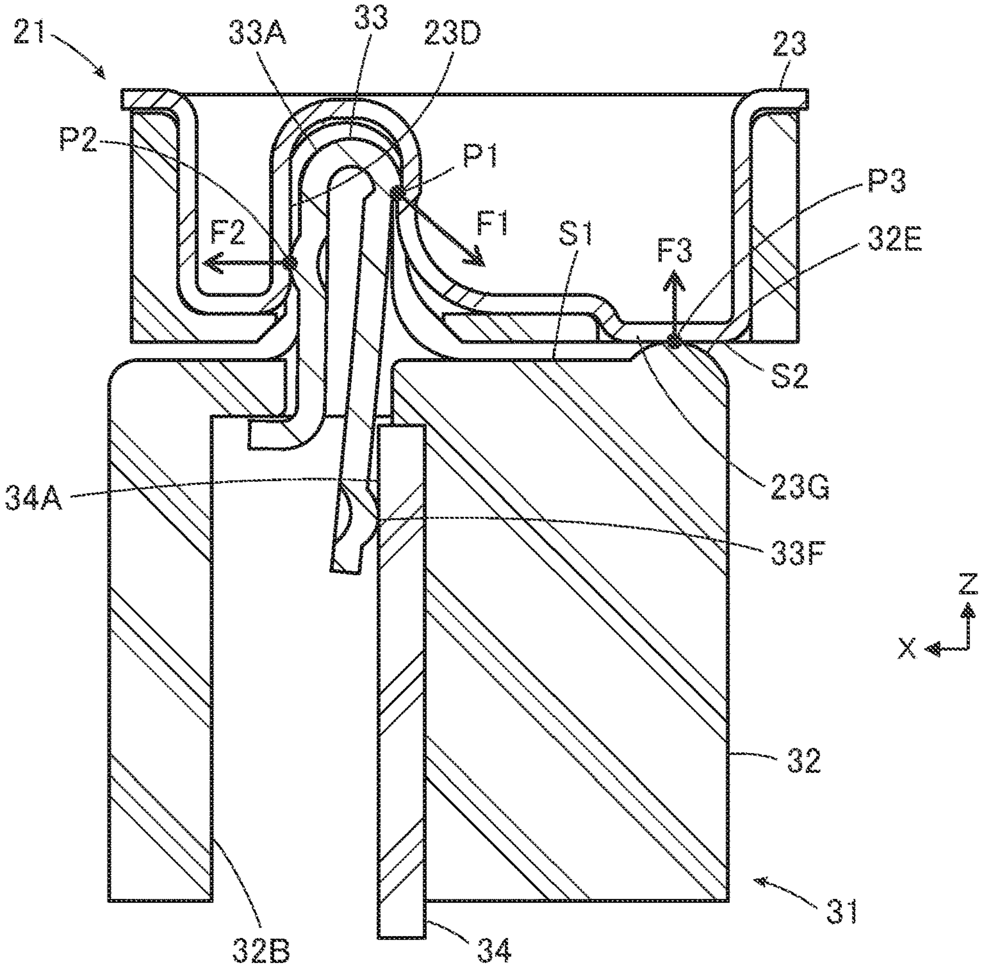
FIG. 31 is a cross-sectional view showing the connector assembly of Embodiment 3 in the fitting state.

At this time, as shown in FIG. 31, a +Z directional portion of the retention projection 33A of the first contact 33 of the first connector 31 is inserted into the projection accommodating portion 23D of the second contact 23 of the second connector 21 from the −Z direction, as with Embodiment 1.

Consequently, the second connector 21 receives the forces F1 acting in the −X direction and the −Z direction from the first contacting portions P1 of the plurality of first contacts 33 of the first connector 31, the forces F2 acting in the +X direction from the second contacting portions P2 of the plurality of first contacts 33, and the forces F3 acting in the +Z direction from the third contacting portions P3 of the plurality of protuberance portions 32E of the first insulator 32 of the first connector 31.

A resultant force of those forces F1, a resultant force of those forces F2, and a resultant force of those forces F3 balance, and the moments balance; therefore, the second connector 21 is stably supported with respect to the first connector 31, and the fitting state of the second connector 21 with respect to the first connector 31 is maintained.

The first contacting portion P1 and the second contacting portion P2 of the retention projection 33A of the first contact 33 make contact with the inner surface of the projection accommodating portion 23D of the second contact 23, whereby the first contact 33 is electrically connected to the second contact 23.

In addition, the protrusion portion 33F of the first contact 33 makes contact with the corresponding connection portion 34A of the circuit board 34, so that the first contact 33 is electrically connected to the connection portion 34A of the circuit board 34; thus, the second contact 23 is electrically connected to the connection portion 34A of the circuit board 34 via the first contact 33 in the fitting state between the first connector 31 and the second connector 21.

Thus, also in Embodiment 3, it is possible to stably maintain the fitting state between the first connector 31 and the second connector 21 and connect the second contacts 23 of the second connector 21 to the connection portions 34A of the circuit board 34 with a simple structure without the use of a dedicated mechanism for locking the fitting state, as with Embodiments 1 and 2.

Figure 32:
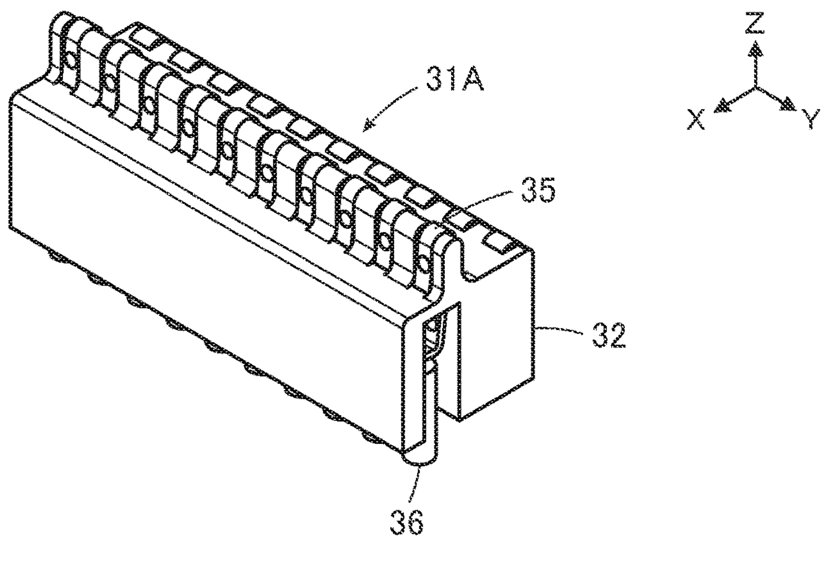
FIG. 32 is a perspective view showing a first connector in a modification of Embodiment 3.

FIG. 32 shows a first connector 31A used in a connector assembly according to a modification of Embodiment 3. The first connector 31A is configured such that, in place of the plurality of first contacts 33, a plurality of first contacts 35 are retained in the first insulator 32, and in place of the circuit board 34, a plurality of cables 36 are connected to the plurality of first contacts 35 in the first connector 31 used in Embodiment 3.

Figure 33:
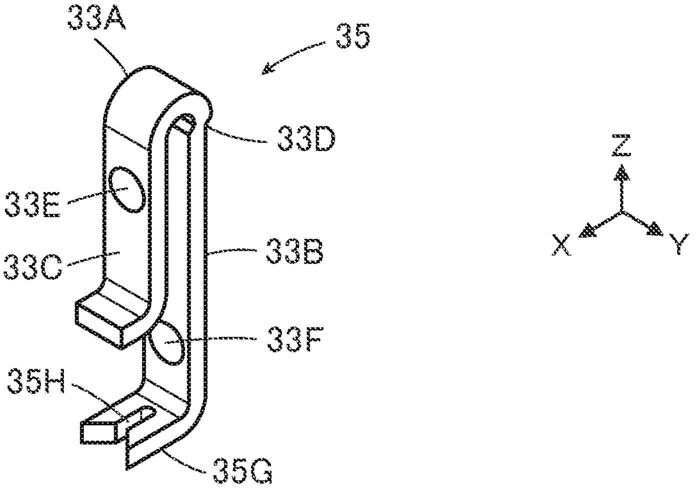
FIG. 33 is a perspective view showing a first contact used in the first connector in the modification of Embodiment 3.

As shown in FIG. 33, the first contact 35 is formed in such a manner that a cable connecting portion 35G extends in the +X direction from the −Z directional end of the lateral surface 33B, on the −X direction side, of the retention projection 33A and a cutout 35H is formed in the cable connecting portion 35G to open toward the +X direction.

Figure 34:
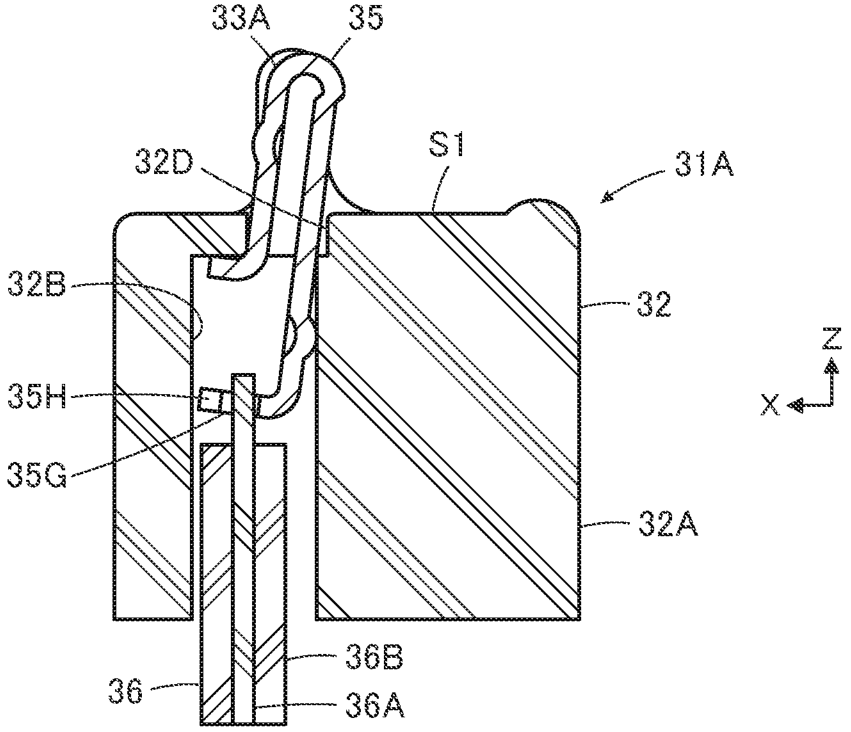
FIG. 34 is a cross-sectional view showing the first connector in the modification of Embodiment 3.

When the first connector 31A is assembled, as shown in FIG. 34, the first contact 35 with its cable connecting portion 35G being connected to the corresponding cable 36 in advance is inserted into the groove portion 32B of the insulator body 32A from the −Z direction, and then the retention projection 33A of the first contact 35 is inserted into the corresponding through-hole 32D of the insulator body 32A from the −Z direction. As a result, the retention projection 33A of the first contact 35 projects in the +Z direction from the first exposed surface S1 of the insulator body 32A.

The cable 36 has a structure in which the outer periphery of a conductor portion 36A is covered with an insulating coating portion 36B. The conductor portion 36A is electrically connected to the first contact 35 by being press-fitted into the cutout 35H of the cable connecting portion 35G of the first contact 35.

Even with the first connector 31A as above, it is also possible to stably maintain the fitting state between the first connector 31A and the second connector 21 and connect the second contacts 23 of the second connector 21 to the conductor portions 36A of the cables 36 with a simple structure without the use of a dedicated mechanism for locking the fitting state, as with Embodiment 3.

Embodiment 4

Figure 35:
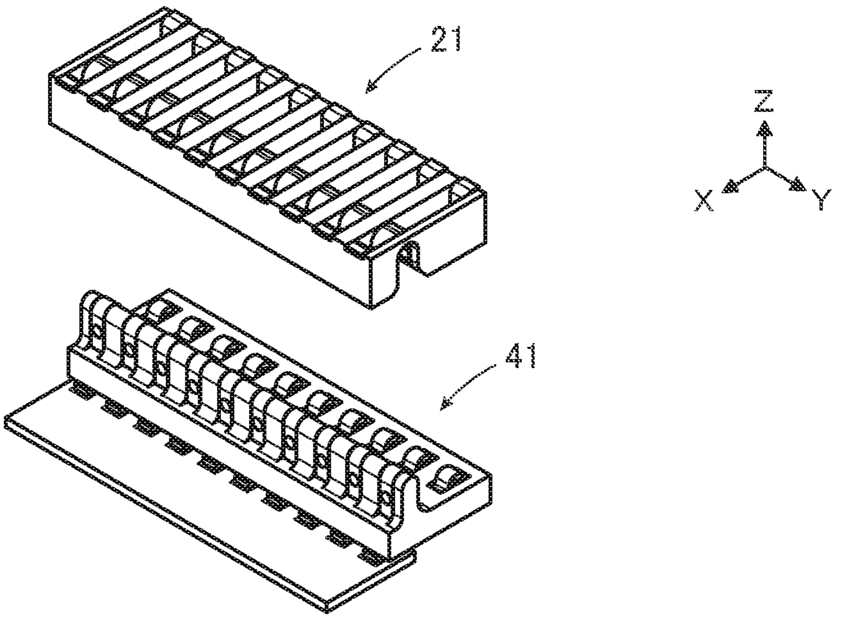
FIG. 35 is a perspective view showing a connector assembly of Embodiment 4 before fitting.

FIG. 35 shows a connector assembly according to Embodiment 4 before fitting. This connector assembly is obtained by using a first connector 41 in place of the first connector 11 in the connector assembly of Embodiment 1, and the second connector 21 used in Embodiment 1 is fitted to the first connector 41.

Figure 36:
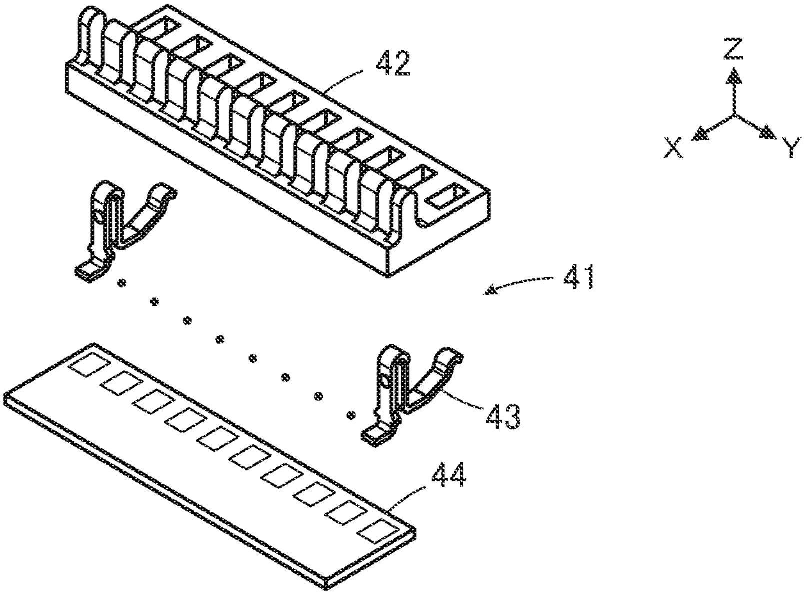
FIG. 36 is an exploded perspective view of a first connector in Embodiment 4.

As shown in FIG. 36, the first connector 41 includes a first insulator 42 made of an insulating material. A plurality of first contacts 43 are disposed on the −Z direction side from the first insulator 42, and a circuit board 44 is disposed on the −Z direction side from the plurality of first contacts 43.

Figure 37:
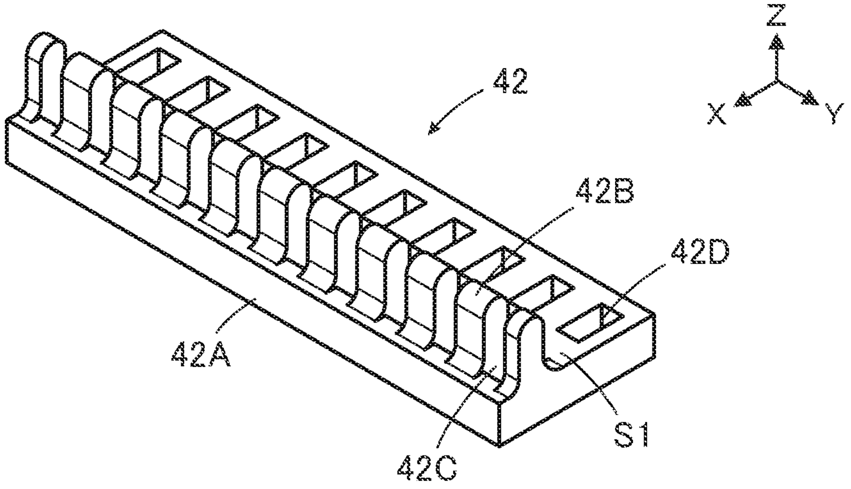
FIG. 37 is a perspective view showing a first insulator used in the first connector in Embodiment 4.

As shown in FIG. 37, the first insulator 42 includes a flat plate portion 42A extending along an XY plane and a first exposed surface S1 extending along an XY plane and facing the +Z direction. A plurality of projections 42B aligned in the Y direction and projecting in the +Z direction are formed on the top surface, facing the +Z direction, of the flat plate portion 42A. A plurality of through-holes 42C penetrating the flat plate portion 42A in the Z direction as shown in FIG. 38 are each formed between adjacent projections 42B.

In addition, the top surface, facing the +Z direction, of the flat plate portion 42A is provided with a plurality of through-holes 42D that are aligned in the Y direction on the −X direction side from the plurality of projections 42B and penetrate the flat plate portion 42A in the Z direction.

The plurality of through-holes 42D are situated at the same Y-directional positions as the plurality of through-holes 42C, and the plurality of through-holes 42C and the plurality of through-holes 42D correspond to the plurality of first contacts 43.

Figure 38:
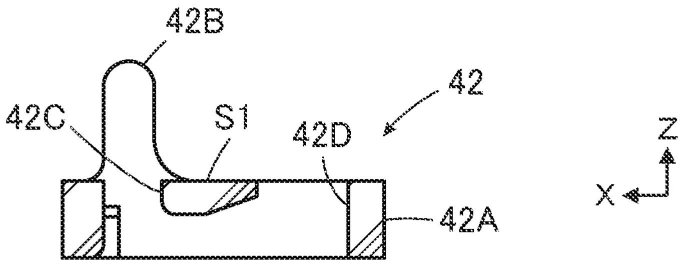
FIG. 38 is a cross-sectional view showing the first insulator used in the first connector in Embodiment 4.

As shown in FIG. 38, the through-hole 42C and the through-hole 42D that are situated at the same Y-directional position communicate with each other in a −Z directional portion of the flat plate portion 42A.

Figure 39:
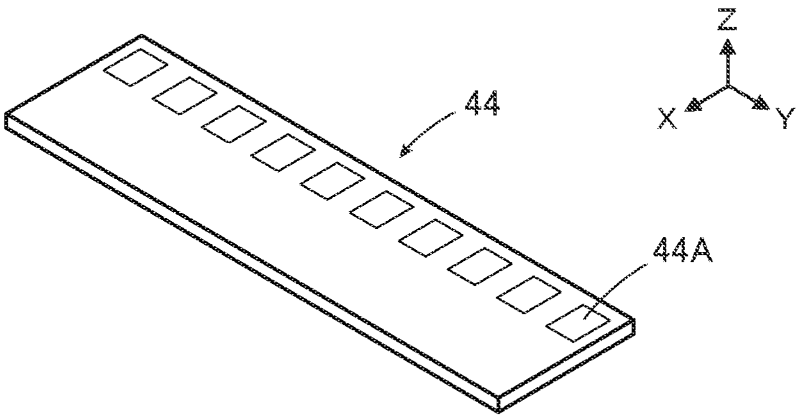
FIG. 39 is a perspective view showing a circuit board used in the first connector in Embodiment 4.

As shown in FIG. 39, the circuit board 44 is constituted of a so-called flexible printed circuit (FPC) that extends along an XY plane, and a plurality of connection portions 44A aligned in the Y direction are exposed on the surface, facing the +Z direction, of the circuit board 44 at the −X directional end of the circuit board 44. The plurality of connection portions 44A correspond to the plurality of first contacts 43.

Figure 40:
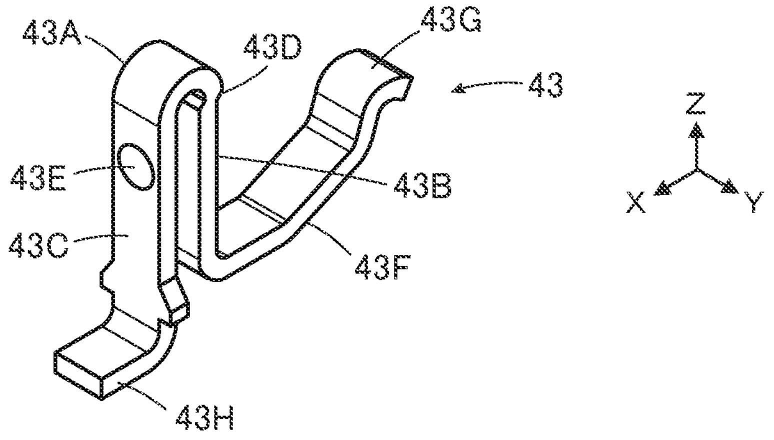
FIG. 40 is a perspective view showing a first contact used in the first connector in Embodiment 4.

As shown in FIG. 40, the first contact 43 is formed from a band-shaped plate member that is made of a conductive material such as metal and that is bent, and the first contact 43 includes a retention projection 43A bent in a U shape and extending in the Z direction. The retention projection 43A has a lateral surface 43B facing the −X direction and a lateral surface 43C facing the +X direction, and the lateral surface 43B is provided at its +Z directional end with a hook portion 43D protruding in a right angle shape or a chevron shape and facing the −X direction and the −Z direction. The lateral surface 43C is provided with a protrusion portion 43E protruding in the +X direction on the −Z direction side from the hook portion 43D at a position closer to the base portion of the retention projection 43A than the hook portion 43D is.

A cantilever portion 43F extends in the −X direction and the +Z direction from the −Z directional end of the lateral surface 43B, and the −X directional end of the cantilever portion 43F is provided with a curved portion 43G curving in a convex shape toward the +Z direction.

Further, a connection portion 43H extends in the +X direction from the −Z directional end of the lateral surface 43C.

Figure 41:
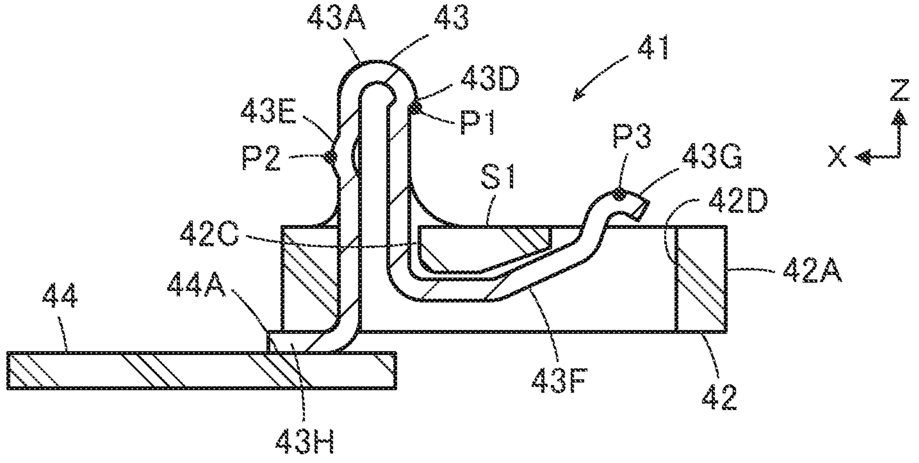
FIG. 41 is a cross-sectional view showing the first connector in Embodiment 4.

When the first connector 41 is assembled, as shown in FIG. 41, the retention projection 43A of the first contact 43 is inserted into the corresponding through-hole 42C of the first insulator 42 from the −Z direction. Since the cantilever portion 43F of the first contact 43 extends in the −X direction and the +Z direction from the −Z directional end of the lateral surface 43B, when the retention projection 43A is inserted into the through-hole 42C of the first insulator 42, the curved portion 43G formed at the −X directional end of the cantilever portion 43F projects in the +Z direction from the first exposed surface S1 through the through-hole 42D of the first insulator 42.

In this state, the connection portions 43H of the plurality of first contacts 43 are connected to the plurality of connection portions 44A of the circuit board 44 by soldering or other means.

In the first connector 41 configured as above, a first contacting portion P1 facing the −X direction and the −Z direction is set by the hook portion 43D of the first contact 43, a second contacting portion P2 facing the +X direction and situated on the −Z direction side from the first contacting portion P1 is set by the protrusion portion 43E, and a third contacting portion P3 situated on the first exposed surface S1 at a position away from the first contacting portion P1 in the −X direction and facing the +Z direction is set by the curved portion 43G.

The second connector 21 is retained with respect to the first connector 41 owing to the first contacting portion P1, the second contacting portion P2, and the third contacting portion P3 making contact with the second connector 21.

Figure 42:
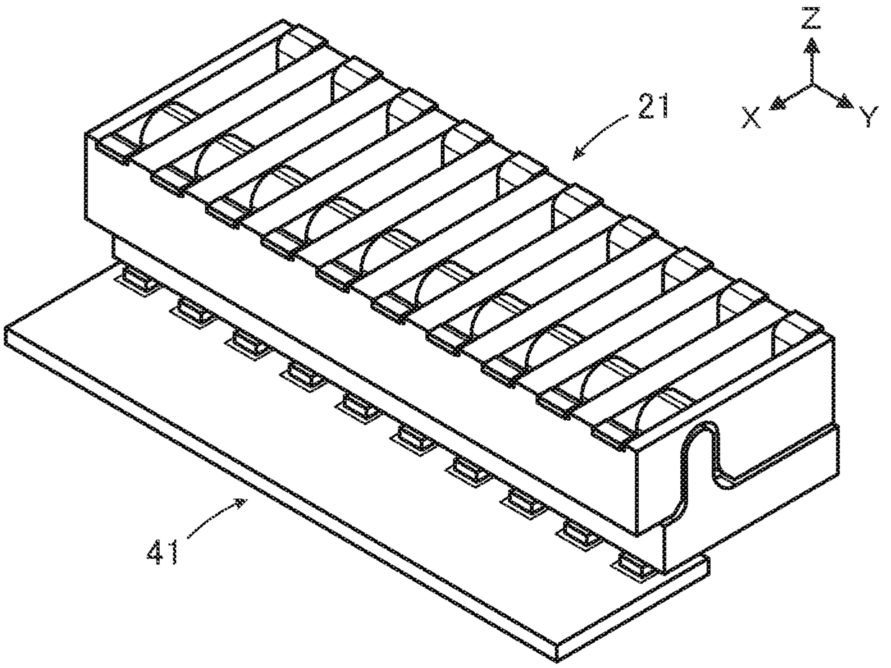
FIG. 42 is a perspective view showing the connector assembly of Embodiment 4 in a fitting state.

From the state where the second connector 21 is disposed on the +Z direction side from the first connector 41 as shown in FIG. 35, the second connector 21 is moved in the −Z direction and thereby fitted to the first connector 41 as shown in FIG. 42.

Figure 43:
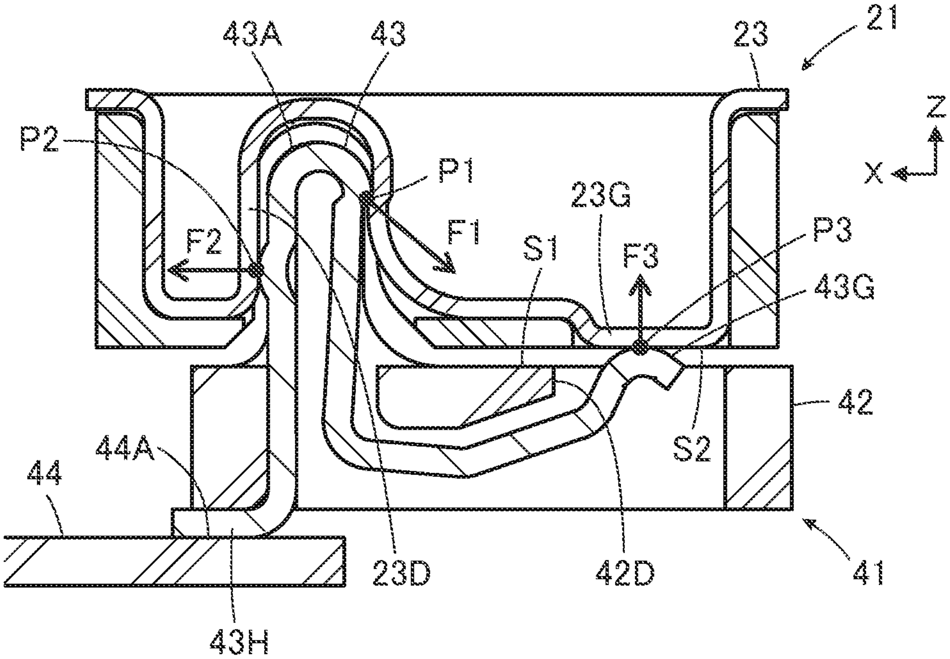
FIG. 43 is a partial cross-sectional view showing the connector assembly of Embodiment 4 in the fitting state.

At this time, as shown in FIG. 43, a +Z directional portion of the retention projection 43A of the first contact 43 of the first connector 41 is inserted into the projection accommodating portion 23D of the second contact 23 of the second connector 21 from the −Z direction, and the first contacting portion P1 and the second contacting portion P2 set at the retention projection 43A separately make contact with the inner surface of the projection accommodating portion 23D of the second contact 23, as with Embodiment 1. Further, the third contacting portion P3 set at the curved portion 43G of the first contact 43 projecting in the +Z direction from the first exposed surface S1 through the through-hole 42D of the first insulator 42 makes contact with the bottom surface of the step portion 23G of the second contact 23.

Consequently, the second connector 21 receives the forces F1 acting in the −X direction and the −Z direction from the first contacting portions P1 of the plurality of first contacts 43 of the first connector 41, the forces F2 acting in the +X direction from the second contacting portions P2 thereof, and the forces F3 acting in the +Z direction from the third contacting portions P3 thereof.

A resultant force of those forces F1, a resultant force of those forces F2, and a resultant force of those forces F3 balance, and the moments balance; therefore, the second connector 21 is stably supported with respect to the first connector 41, and the fitting state of the second connector 21 with respect to the first connector 41 is maintained.

The first contacting portion P1 and the second contacting portion P2 of the retention projection 43A of the first contact 43 make contact with the inner surface of the projection accommodating portion 23D of the second contact 23, and the third contacting portion P3 of the curved portion 43G of the first contact 43 makes contact with the bottom surface of the step portion 23G of the second contact 23, whereby the first contact 43 is electrically connected to the second contact 23. In addition, the connection portion 43H of the first contact 43 makes contact with the connection portion 44A of the circuit board 44, so that the second contact 23 is electrically connected to the connection portion 44A of the circuit board 44 via the first contact 43 in the fitting state between the first connector 41 and the second connector 21.

Thus, also in Embodiment 4, it is possible to stably maintain the fitting state between the first connector 41 and the second connector 21 and connect the second contacts 23 of the second connector 21 to the connection portions 44A of the circuit board 44 with a simple structure without the use of a dedicated mechanism for locking the fitting state, as with Embodiments 1 to 3.

Embodiment 5

Figure 44:
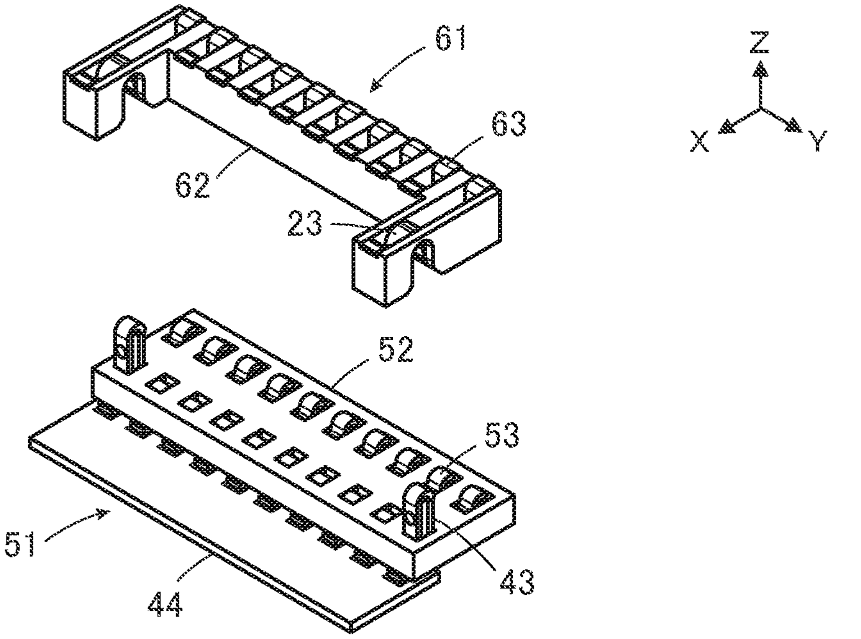
FIG. 44 is a perspective view showing a connector assembly of Embodiment 5 before fitting.

FIG. 44 shows a connector assembly according to Embodiment 5 before fitting. The connector assembly is composed of a first connector 51 and a second connector 61 to be fitted to each other.

The first connector 51 includes: a first insulator 52 made of an insulating material; and a pair of the first contacts 43 and a plurality of third contacts 53 that are retained in the first insulator 52. The pair of first contacts 43 and the plurality of third contacts 53 are attached to the circuit board 44.

The second connector 61 includes: a second insulator 62 made of an insulating material; and a pair of the second contacts 23 and a plurality of fourth contacts 63 that are retained in the second insulator 62.

The pair of first contacts 43 and the plurality of third contacts 53 are aligned at the same alignment pitch in the Y direction as the pair of second contacts 23 and the plurality of fourth contacts 63.

Figure 45:
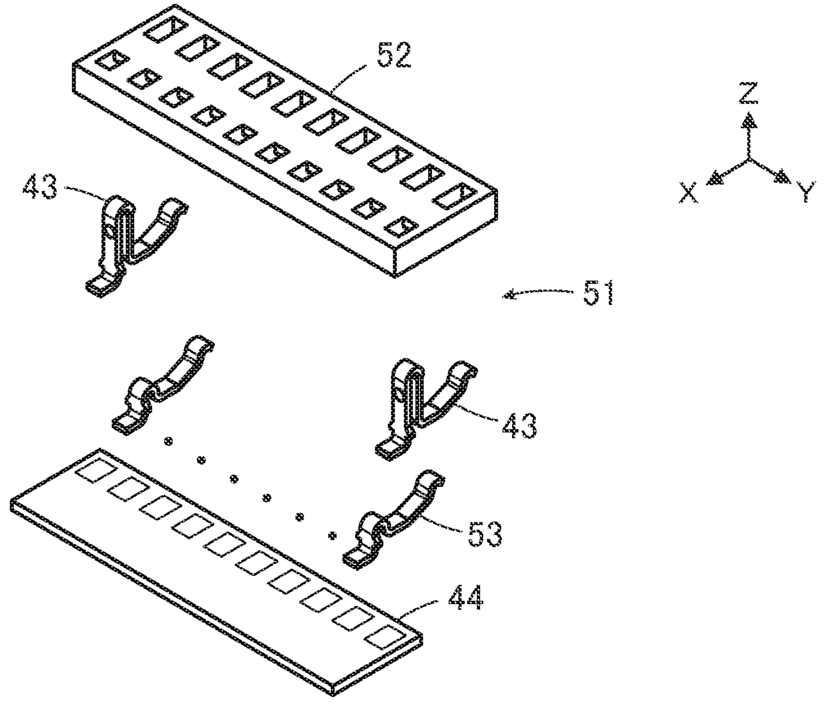
FIG. 45 is an exploded perspective view of a first connector in Embodiment 5.

FIG. 45 is an exploded perspective view of the first connector 51. The pair of first contacts 43 are disposed on the −Z direction side from the first insulator 52, the plurality of third contacts 53 are disposed on the −Z direction side from the pair of first contacts 43, and the circuit board 44 is disposed on the −Z direction side from the plurality of third contacts 53.

The first contact 43 and the circuit board 44 herein are identical to those used in Embodiment 4 and shown in FIGS. 40 and 39, respectively. However, the first contacts 43 are disposed only at two positions, i.e., at the +Y and −Y directional ends of the first connector 51, and the plurality of third contacts 53 are disposed between the pair of first contacts 43.

Figure 46:
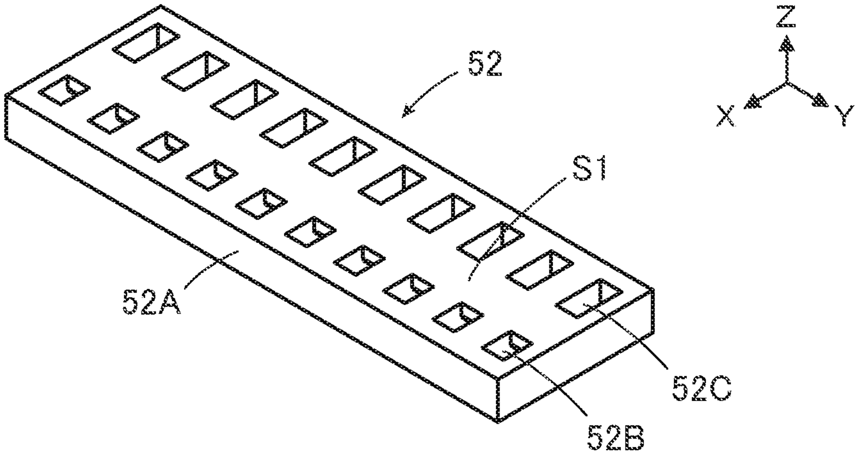
FIG. 46 is a perspective view showing a first insulator used in the first connector in Embodiment 5.

As shown in FIG. 46, the first insulator 52 includes a flat plate portion 52A elongated in the Y direction along an XY plane and a first exposed surface S1 formed by the top surface, on the +Z direction side, of the flat plate portion 52A. A plurality of through-holes 52B aligned in the Y direction and penetrating the flat plate portion 52A in the Z direction are formed on the +X direction side of the flat plate portion 52A, and a plurality of through-holes 52C aligned in the Y direction and penetrating the flat plate portion 52A in the Z direction are formed on the −X direction side of the flat plate portion 52A.

Figure 47:
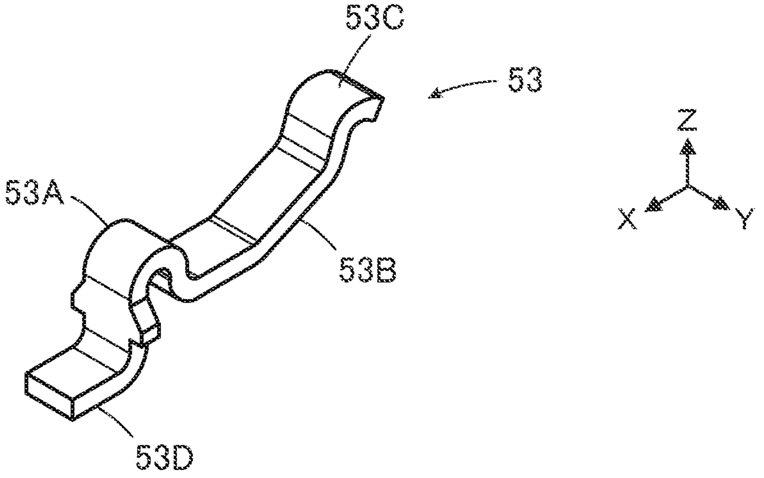
FIG. 47 is a perspective view showing a third contact used in the first connector in Embodiment 5.

As shown in FIG. 47, the third contact 53 is configured to have, in place of the retention projection 43A extending in the Z direction, a U-shaped portion 53A with a small height in the Z direction in the first contact 43 shown in FIG. 40, and otherwise has the same structure as the first contact 43. Specifically, cantilever portion 53B extends in the −X direction and the +Z direction from the −Z directional end of the U-shaped portion 53A, and the −X directional end of the cantilever portion 53B is provided with a curved portion 53C curving in a convex shape toward the +Z direction. Further, a connection portion 53D extends in the +X direction from the −Z directional end of the U-shaped portion 53A.

When the first connector 51 is assembled, the retention projections 43A of the pair of first contacts 43 disposed at the opposite ends in the Y direction are inserted from the −Z direction into the corresponding through-holes 52B of the first insulator 52, i.e., the through-holes 52B situated at the opposite ends in the Y direction among the plurality of through-holes 52B.

Likewise, the U-shaped portions 53A of the plurality of third contacts 53 are inserted from the −Z direction into the corresponding through-holes 52B of the first insulator 52, i.e., the through-holes 52B other than those situated at the opposite ends in the Y direction among the plurality of through-holes 52B.

In this state, the connection portions 43H of the pair of first contacts 43 and the connection portions 53D of the plurality of third contacts 53 are connected to the plurality of connection portions 44A of the circuit board 44 by soldering or other means.

Figure 48:
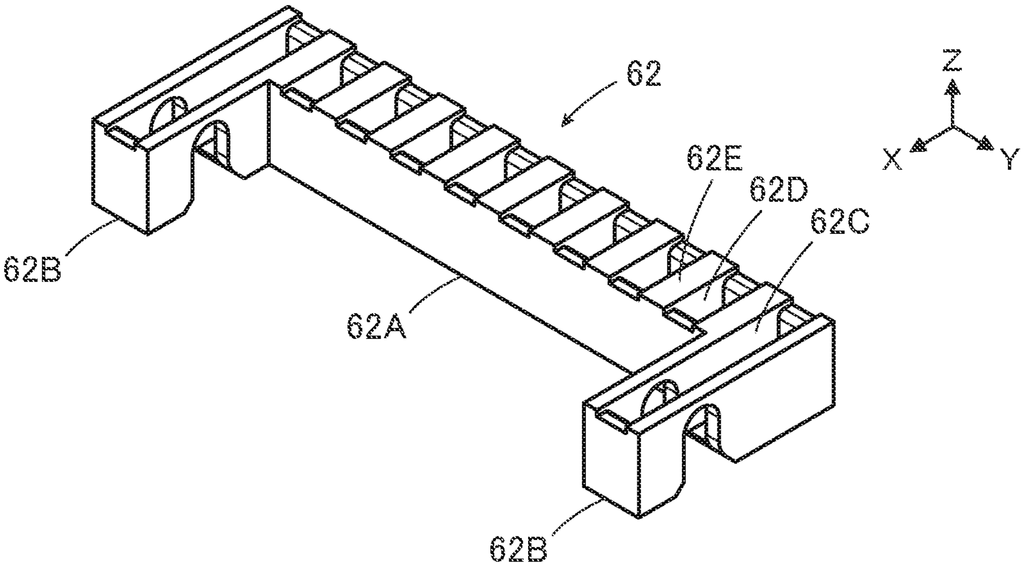
FIG. 48 is a perspective view showing a second insulator used in a second connector in Embodiment 5.

As shown in FIG. 48, the second insulator 62 has a structure in which a pair of arm portions 62B extending in the +X direction are joined separately to the opposite ends, in the Y direction, of a body portion 62A of rectangular cuboid shape elongated in the Y direction.

The pair of arm portions 62B each have a contact accommodating portion 62C of recess shape to accommodate the second contact 23 shown in FIG. 10.

The body portion 62A has a plurality of contact accommodating portions 62D of recess shape that are aligned in the Y direction and each accommodate the fourth contact 63. The contact accommodating portion 62D is formed by a through-hole penetrating the body portion 62A in the Z direction. A partition plate 62E extending along an XZ plane is formed between adjacent contact accommodating portions 62D.

Figure 49:
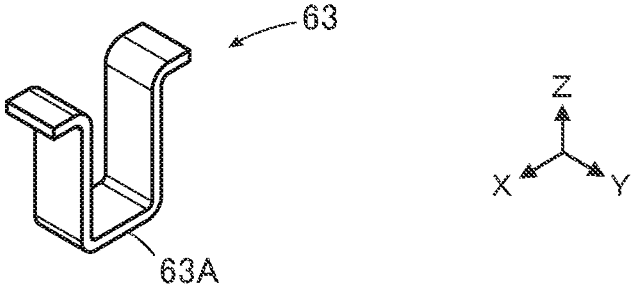
FIG. 49 is a perspective view showing a fourth contact used in the second connector in Embodiment 5.

As shown in FIG. 49, the fourth contact 63 is formed from a band-shaped plate member made of a conductive material such as metal and is bent in a U shape opening toward the +Z direction. The −Z directional end of the fourth contact 63 is provided with a flat plate portion 63A extending along an XY plane and constituting a bottom portion of the U shape.

The second connector 61 is assembled by inserting the second contacts 23 into the contact accommodating portions 62C of the pair of arm portions 62B of the second insulator 62 from the +Z direction and inserting the fourth contacts 63 into the plurality of contact accommodating portions 62D of the body portion 62A from the +Z direction.

Figure 50:
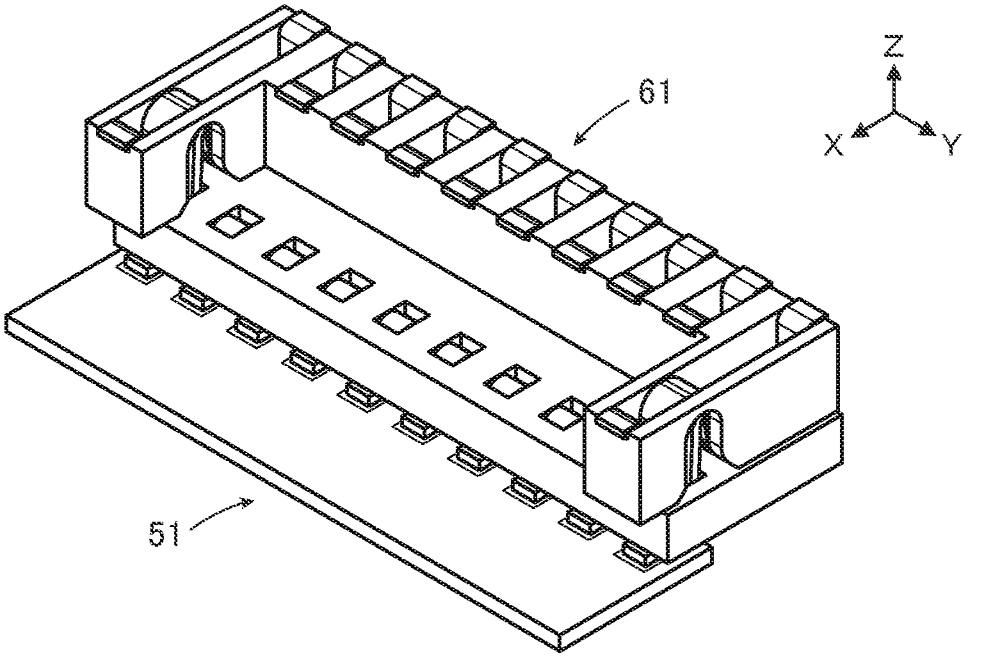
FIG. 50 is a perspective view showing the connector assembly of Embodiment 5 in a fitting state.

From the state where the second connector 61 is disposed on the +Z direction side from the first connector 51 as shown in FIG. 44, the second connector 61 is moved in the −Z direction and thereby fitted to the first connector 51 as shown in FIG. 50.

Figure 51:
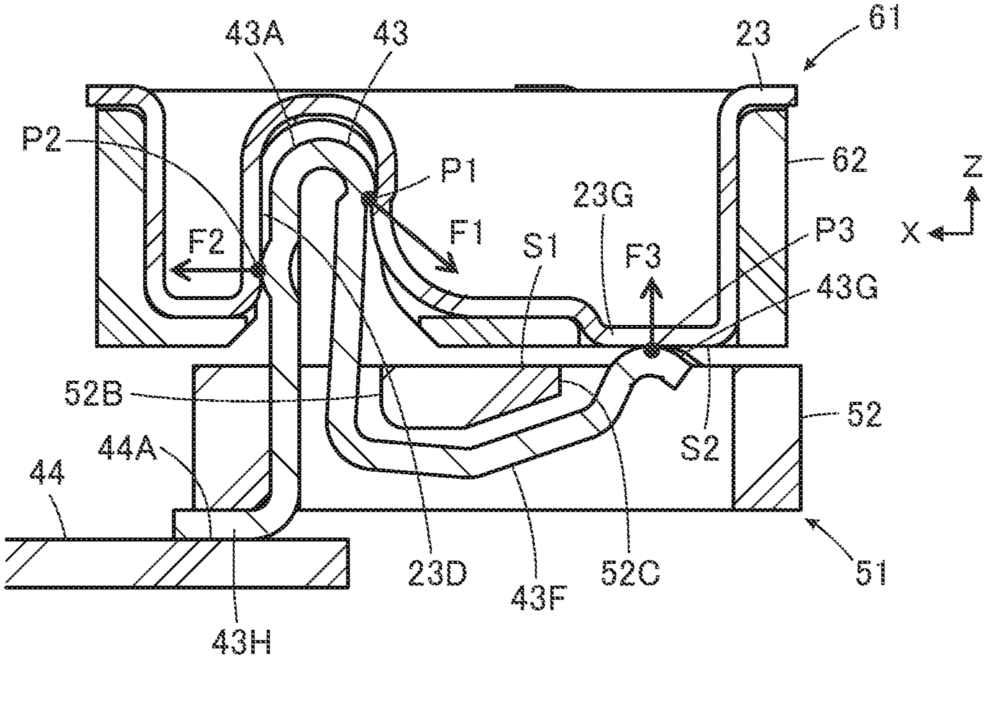
FIG. 51 is a partial cross-sectional view showing the connector assembly of Embodiment 5 in the fitting state in a cross section passing through the first contact and the second contact.

At this time, as shown in FIG. 51, a +Z directional portion of the retention projection 43A of the first contact 43 of the first connector 51 is inserted into the projection accommodating portion 23D of the second contact 23 of the second connector 61 from the −Z direction, and a first contacting portion P1 and a second contacting portion P2 set at the retention projection 43A separately make contact with the inner surface of the projection accommodating portion 23D of the second contact 23, as with Embodiment 1. Further, the curved portion 43G formed at the end of the cantilever portion 43F of the first contact 43 projects in the +Z direction from the first exposed surface S1 through the corresponding through-hole 52C of the first insulator 52, and a third contacting portion P3 set at the curved portion 43G makes contact with the bottom surface of the step portion 23G of the second contact 23.

Figure 52:
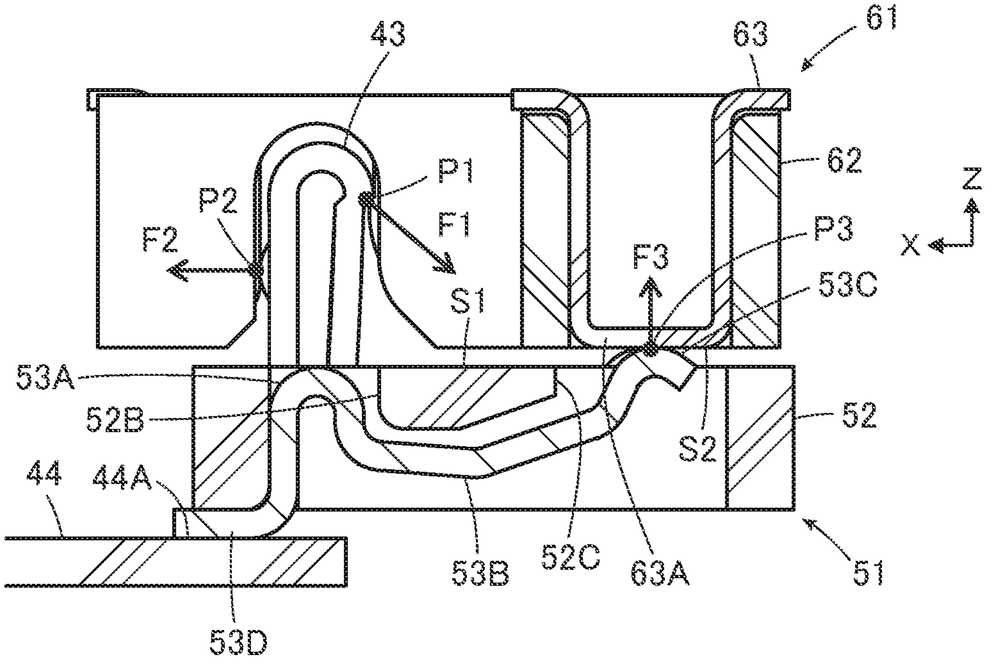
FIG. 52 is a partial cross-sectional view showing the connector assembly of Embodiment 5 in the fitting state in a cross section passing through the third contact and the fourth contact.

In addition, as shown in FIG. 52, the U-shaped portion 53A of the third contact 53 of the first connector 51 is inserted into the corresponding through-hole 52B of the second connector 61 from the −Z direction, and the curved portion 53C formed at the end of the cantilever portion 53B of the third contact 53 projects in the +Z direction from the first exposed surface S1 through the corresponding through-hole 52C of the first insulator 52. A third contacting portion P3 is set also by the surface, facing the +Z direction, of the curved portion 53C, and the third contacting portion P3 of the curved portion 53C makes contact with the bottom surface of the flat plate portion 63A of the corresponding fourth contact 63.

Consequently, the second connector 61 receives the forces F1 acting in the −X direction and the −Z direction from the first contacting portions P1 of the pair of first contacts 43 of the first connector 51, the forces F2 acting in the +X direction from the second contacting portions P2 of the pair of first contacts 43 of the first connector 51, and the forces F3 acting in the +Z direction from the third contacting portions P3 of the pair of first contacts 43 of the first connector 51 and the third contacting portions P3 of the plurality of third contacts 53 thereof.

A resultant force of those forces F1, a resultant force of those forces F2, and a resultant force of those forces F3 balance, and the moments balance; therefore, the second connector 61 is stably supported with respect to the first connector 51, and the fitting state of the second connector 61 with respect to the first connector 51 is maintained.

The first contacting portions P1 and the second contacting portions P2 of the retention projections 43A of the first contacts 43 make contact with the inner surfaces of the projection accommodating portions 23D of the second contacts 23, and the third contacting portions P3 of the curved portions 43G of the first contacts 43 make contact with the bottom surfaces of the step portions 23G of the second contacts 23, whereby the pair of first contacts 43 are electrically connected to the corresponding second contacts 23.

In addition, the third contacting portions P3 of the third contacts 53 make contact with the bottom surfaces of the flat plate portions 63A of the fourth contacts 63, whereby the plurality of third contacts 53 are electrically connected to the corresponding fourth contacts 63.

The connection portions 43H of the pair of first contacts 43 of the first connector 51 and the connection portions 53D of the plurality of third contacts 53 thereof make contact with the plurality of connection portions 44A of the circuit board 44, so that the pair of second contacts 23 and the plurality of fourth contacts 63 of the second connector 61 are electrically connected to the corresponding connection portions 44A of the circuit board 44 via the pair of first contacts 43 and the plurality of third contacts 53 in the fitting state between the first connector 51 and the second connector 61.

Thus, also in Embodiment 5, it is possible to stably maintain the fitting state between the first connector 51 and the second connector 61 and connect the pair of second contacts 23 and the plurality of fourth contacts 63 of the second connector 61 to the corresponding connection portions 44A of the circuit board 44 with a simple structure without the use of a dedicated mechanism for locking the fitting state, as with Embodiments 1 to 4.

Embodiment 6

Figure 53:
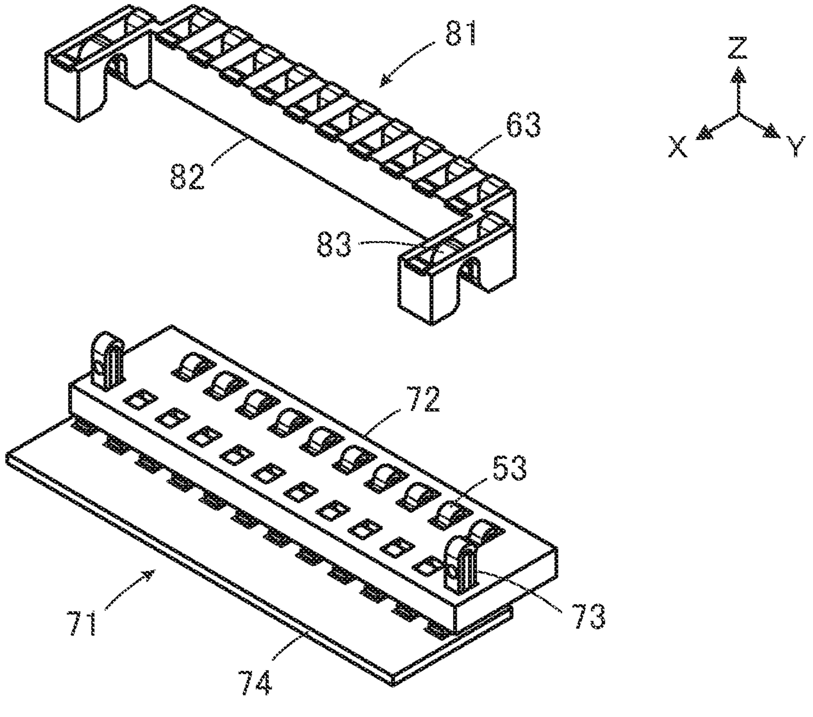
FIG. 53 is a perspective view showing a connector assembly of Embodiment 6 before fitting.

FIG. 53 shows a connector assembly according to Embodiment 6 before fitting. The connector assembly is composed of a first connector 71 and a second connector 81 to be fitted to each other.

The first connector 71 includes: a first insulator 72 made of an insulating material; and a pair of first contacts 73 and a plurality of the third contacts 53 that are retained in the first insulator 72. The pair of first contacts 73 and the plurality of third contacts 53 are attached to a circuit board 74.

The second connector 81 includes: a second insulator 82 made of an insulating material; and a pair of second contacts 83 and a plurality of the fourth contacts 63 that are retained in the second insulator 82.

The pair of first contacts 73 and the plurality of third contacts 53 are aligned at the same alignment pitch in the Y direction as the pair of second contacts 83 and the plurality of fourth contacts 63.

Figure 54:
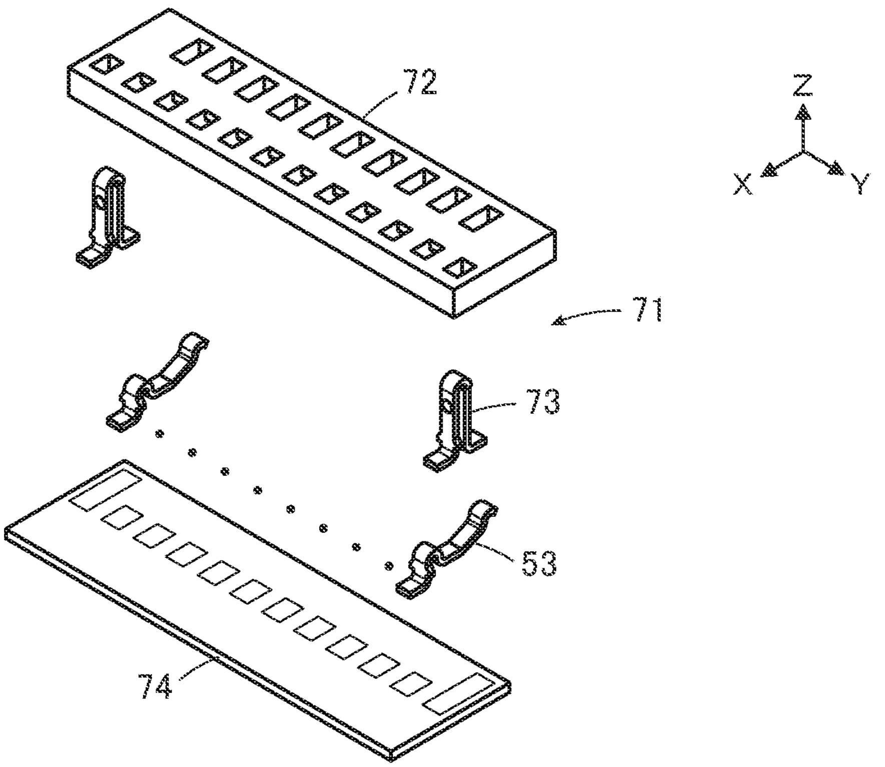
FIG. 54 is an exploded perspective view of a first connector in Embodiment 6.

FIG. 54 is an exploded perspective view of the first connector 71. The pair of first contacts 73 are disposed on the −Z direction side from the first insulator 72, the plurality of third contacts 53 are disposed on the −Z direction side from the pair of first contacts 73, and the circuit board 74 is disposed on the −Z direction side from the plurality of third contacts 53.

The third contact 53 herein is identical to that used in Embodiment 5 and shown in FIG. 47. The plurality of third contacts 53 are disposed between the pair of first contacts 73.

Figure 55:
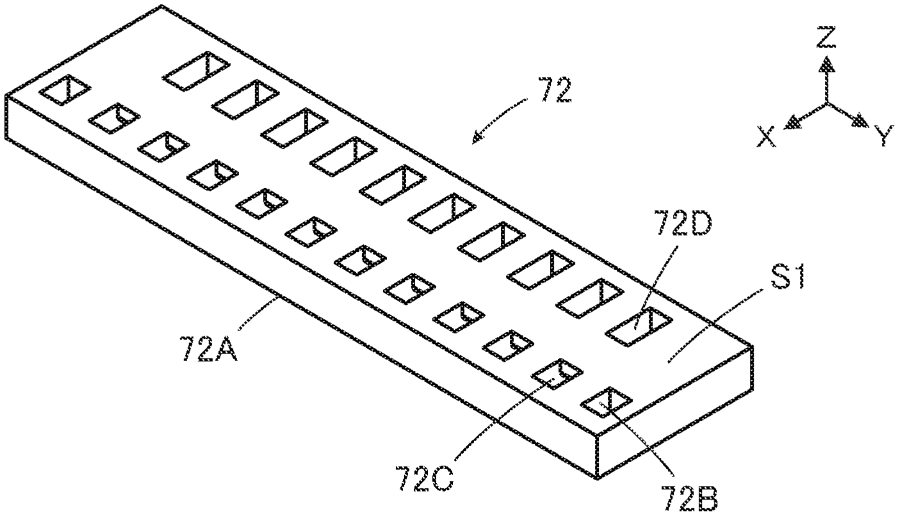
FIG. 55 is a perspective view showing a first insulator used in the first connector in Embodiment 6.

As shown in FIG. 55, the first insulator 72 includes a flat plate portion 72A elongated in the Y direction along an XY plane and a first exposed surface S1 formed by the top surface, on the +Z direction side, of the flat plate portion 72A. On the +X direction side of the flat plate portion 72A, a pair of through-holes 72B are formed at the opposite ends in the Y direction to penetrate the flat plate portion 72A in the Z direction, and a plurality of through-holes 72C are formed to be aligned in the Y direction between the pair of through-holes 72B and penetrate the flat plate portion 72A in the Z direction. On the −X direction side of the flat plate portion 72A, a plurality of through-holes 72D are formed to be aligned in the Y direction and penetrate the flat plate portion 72A in the Z direction.

The pair of through-holes 72B are situated at the same X-directional position as the plurality of through-holes 72C, and the plurality of through-holes 72C are situated at the same Y-directional positions as the plurality of the through-holes 72D. The pair of through-holes 72B, the plurality of through-holes 72C, and the plurality of through-holes 72D are aligned at the same alignment pitch in the Y direction.

The pair of through-holes 72B correspond to the pair of first contacts 73, and the plurality of through-holes 72C and the plurality of through-holes 72D correspond to the plurality of third contacts 53.

Figure 56:
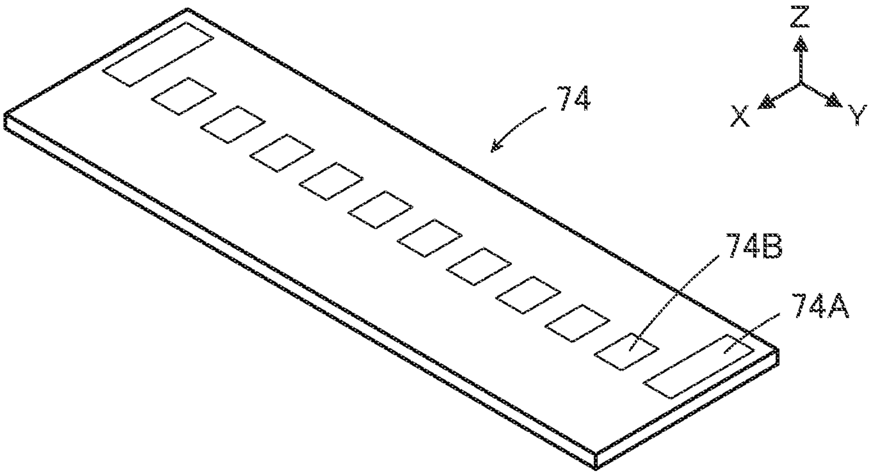
FIG. 56 is a perspective view showing a circuit board used in the first connector in Embodiment 6.

As shown in FIG. 56, the circuit board 74 is constituted of a so-called flexible printed circuit (FPC) that extends along an XY plane. A pair of connection portions 74A disposed at the opposite ends in the Y direction are exposed on the surface, facing the +Z direction, of the circuit board 74, and a plurality of connection portions 74B aligned in the Y direction between the pair of connection portions 74A are exposed on the same surface. The pair of connection portions 74A and the plurality of connection portions 74B are aligned at the same alignment pitch in the Y direction as the pair of through-holes 72B, the plurality of through-holes 72C, and the plurality of through-holes 72D of the first insulator 72.

The pair of connection portions 74A correspond to the pair of first contacts 73, and the plurality of connection portions 74B correspond to the plurality of third contacts 53.

Figure 57:
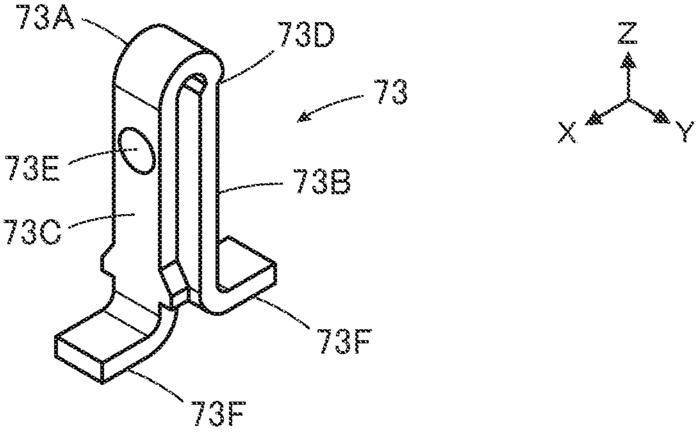
FIG. 57 is a perspective view showing a first contact used in the first connector in Embodiment 6.

As shown in FIG. 57, the first contact 73 is formed from a band-shaped plate member that is made of a conductive material such as metal and that is bent, and the first contact 73 includes a retention projection 73A bent in a U shape and extending in the Z direction. The retention projection 73A has a lateral surface 73B facing the −X direction and a lateral surface 73C facing the +X direction, and the lateral surface 73B is provided at its +Z directional end with a hook portion 73D protruding in a right angle shape or a chevron shape and facing the −X direction and the −Z direction. The lateral surface 73C is provided with a protrusion portion 73E protruding in the +X direction on the −Z direction side from the hook portion 73D at a position closer to the base portion of the retention projection 73A than the hook portion 73D is.

Further, connection portions 73F extend separately in the −X direction and the +X direction from the −Z directional ends of the lateral surfaces 73B and 73C.

When the first connector 71 is assembled, the retention projections 73A of the pair of first contacts 73 disposed at the opposite ends in the Y direction are inserted into the corresponding through-holes 72B of the first insulator 72 from the −Z direction.

Likewise, the U-shaped portions 53A of the plurality of third contacts 53 are inserted into the corresponding through-holes 72C of the first insulator 72 from the −Z direction.

In this state, the connection portions 73F of the pair of first contacts 73 are connected to the pair of connection portions 74A of the circuit board 74 by soldering or other means, and the connection portions 53D of the plurality of third contacts 53 are connected to the plurality of connection portions 74B of the circuit board 74 by soldering or other means.

Figure 58:
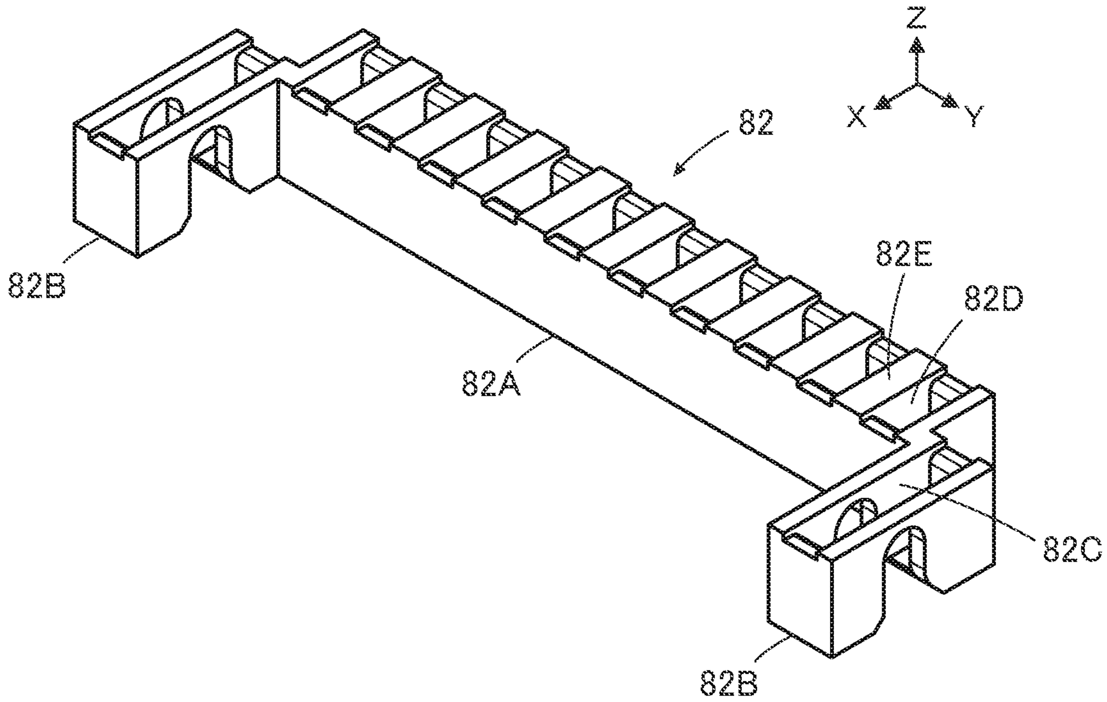
FIG. 58 is a perspective view showing a second insulator used in a second connector in Embodiment 6.

As shown in FIG. 58, the second insulator 82 has a structure in which a pair of arm portions 82B extending in the +X direction are joined separately to the opposite ends, in the Y direction, of a body portion 82A of rectangular cuboid shape elongated in the Y direction.

The pair of arm portions 82B each have a contact accommodating portion 82C of recess shape to accommodate the second contact 83.

The body portion 82A has a plurality of contact accommodating portions 82D of recess shape that are aligned in the Y direction and each accommodate the fourth contact 63 used in Embodiment 5 and shown in FIG. 49. The contact accommodating portion 82D is formed by a through-hole penetrating the body portion 82A in the Z direction. A partition plate 82E extending along an XZ plane is formed between adjacent contact accommodating portions 82D.

Figure 59:
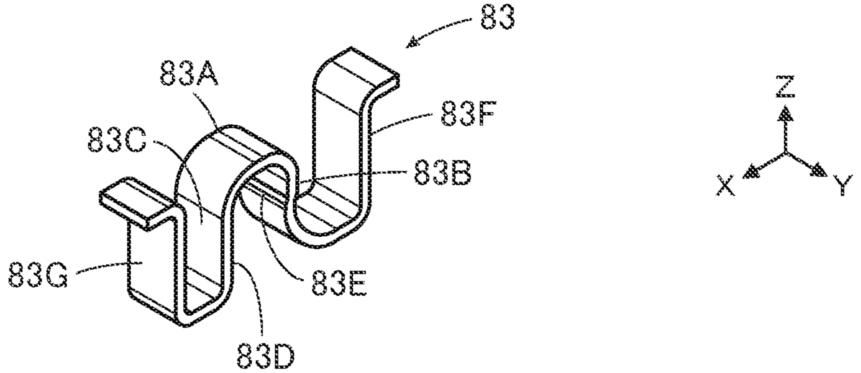
FIG. 59 is a perspective view showing a second contact used in the second connector in Embodiment 6.

As shown in FIG. 59, the second contact 83 is formed from a band-shaped plate member made of a conductive material such as metal and includes a U-shaped portion 83A curved in a U shape opening toward the −Z direction. The U-shaped portion 83A includes a first extension portion 83B extending along a YZ plane on the −X direction side and a second extension portion 83C extending along a YZ plane on the +X direction side. A projection accommodating portion 83D of recess shape is formed inside the U-shaped portion 83A to accommodate the retention projection 73A of the first contact 73. The surface, on the +X direction side, of the first extension portion 83B facing the projection accommodating portion 83D is provided with a receiving portion 83E formed by a concavity for receiving the hook portion 73D of the first contact 73.

The second contact 83 includes a rising portion 83F bent toward the −X direction from the −Z directional end of the first extension portion 83B and rising in the +Z direction and a rising portion 83G bent toward the +X direction from the −Z directional end of the second extension portion 83C and rising in the +Z direction.

The second connector 81 is assembled by inserting the second contacts 83 into the contact accommodating portions 82C of the pair of arm portions 82B of the second insulator 82 from the +Z direction and inserting the fourth contacts 63 into the plurality of contact accommodating portions 82D of the body portion 82A from the +Z direction.

Figure 60:
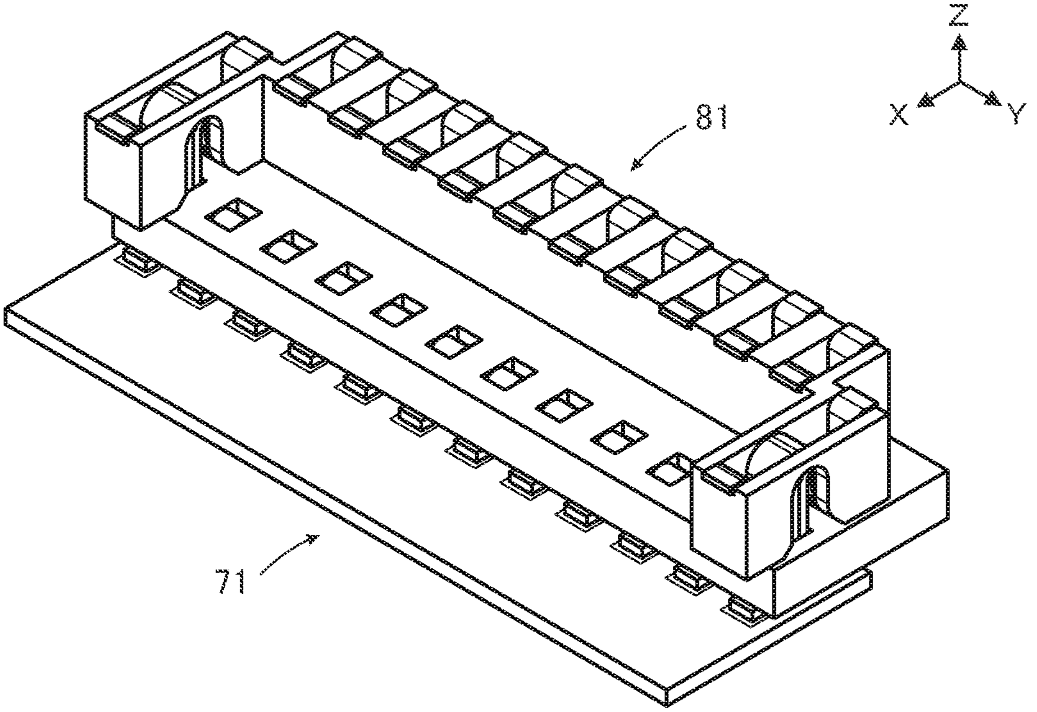
FIG. 60 is a perspective view showing the connector assembly of Embodiment 6 in a fitting state.

From the state where the second connector 81 is disposed on the +Z direction side from the first connector 71 as shown in FIG. 53, the second connector 81 is moved in the −Z direction and thereby fitted to the first connector 71 as shown in FIG. 60.

Figure 61:
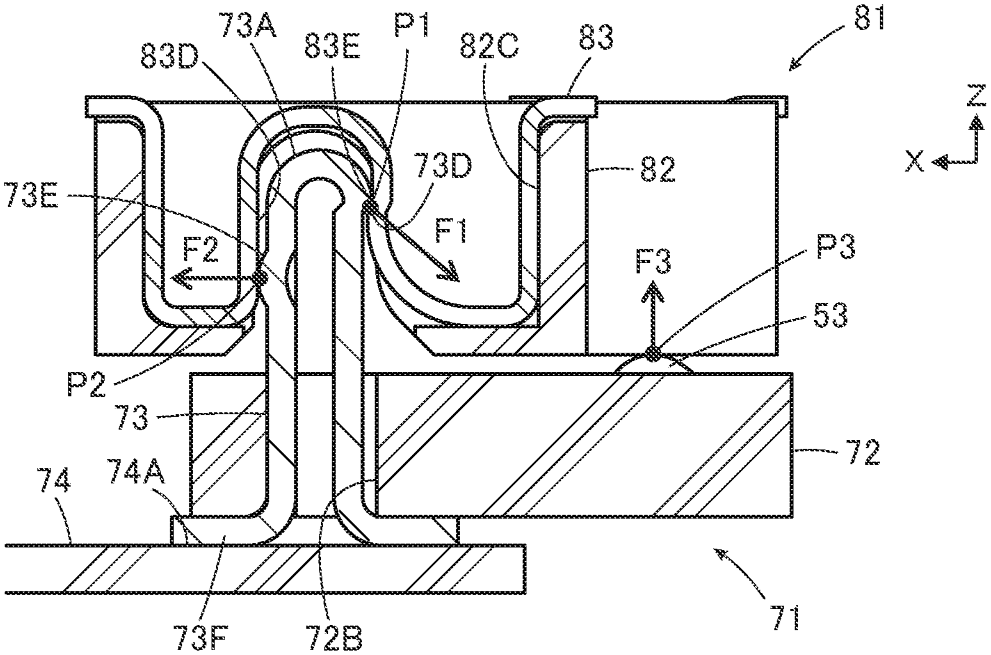
FIG. 61 is a partial cross-sectional view showing the connector assembly of Embodiment 6 in the fitting state in a cross section passing through the first contact and the second contact.

At this time, as shown in FIG. 61, a +Z directional portion of the retention projection 73A of the first contact 73 of the first connector 71 is inserted into the projection accommodating portion 83D of the second contact 83 of the second connector 81 from the −Z direction, and a first contacting portion P1 set by the hook portion 73D of the retention projection 73A and a second contacting portion P2 set by the protrusion portion 73E separately make contact with the inner surface of the projection accommodating portion 83D of the second contact 83, as with Embodiment 1.

Figure 62:
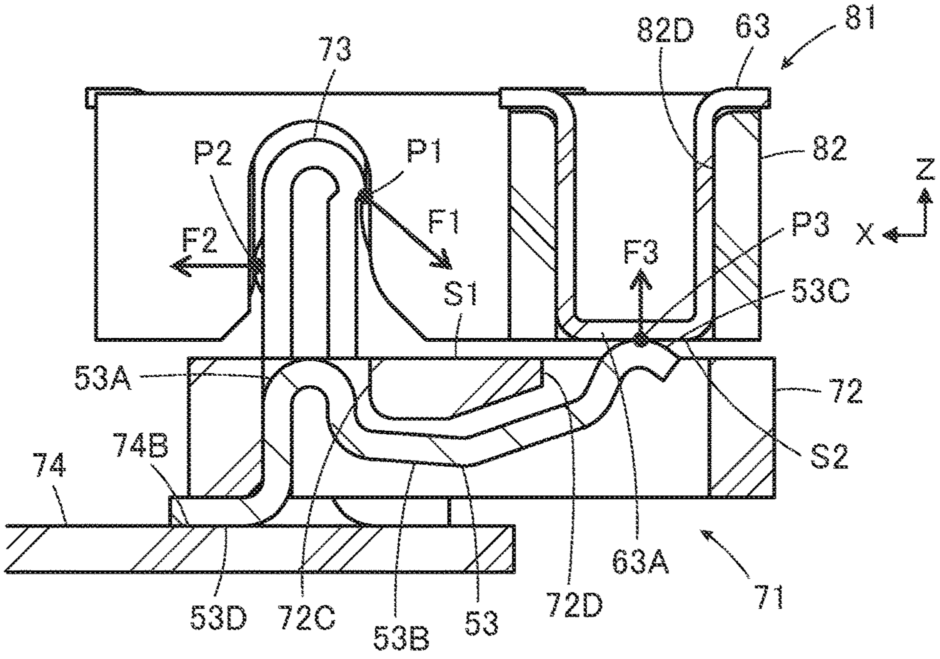
FIG. 62 is a partial cross-sectional view showing the connector assembly of Embodiment 6 in the fitting state in a cross section passing through the third contact and the fourth contact.

Further, as shown in FIG. 62, a third contacting portion P3 set by the curved portion 53C formed at the end of the cantilever portion 53B of each of the plurality of third contacts 53 makes contact with the bottom surface of the flat plate portion 63A of the corresponding fourth contact 63.

Consequently, the second connector 81 receives forces F1 acting in the −X direction and the −Z direction from the first contacting portions P1 of the pair of first contacts 73 of the first connector 71, forces F2 acting in the +X direction from the second contacting portions P2 of the pair of first contacts 73 of the first connector 71, and forces F3 acting in the +Z direction from the third contacting portions P3 of the plurality of third contacts 53 of the first connector 71.

A resultant force of those forces F1, a resultant force of those forces F2, and a resultant force of those forces F3 balance, and the moments balance; therefore, the second connector 81 is stably supported with respect to the first connector 71, and the fitting state of the second connector 81 with respect to the first connector 71 is maintained.

The first contacting portions P1 and the second contacting portions P2 of the retention projections 73A of the pair of first contacts 73 make contact with the inner surfaces of the projection accommodating portions 83D of the second contacts 83, whereby the pair of first contacts 73 are electrically connected to the corresponding second contacts 83.

In addition, the third contacting portions P3 of the plurality of third contacts 53 make contact with the bottom surfaces of the flat plate portions 63A of the fourth contacts 63, whereby the plurality of third contacts 53 are electrically connected to the corresponding fourth contacts 63.

The connection portions 73F of the pair of first contacts 73 of the first connector 71 are connected to the pair of connection portions 74A of the circuit board 74, and the connection portions 53D of the plurality of third contacts 53 are connected to the plurality of connection portions 74B of the circuit board 74, so that the pair of second contacts 83 and the plurality of fourth contacts 63 of the second connector 81 are electrically connected to the pair of connection portions 74A and the plurality of connection portions 74B of the circuit board 74 via the pair of first contacts 73 and the plurality of third contacts 53 in the fitting state between the first connector 71 and the second connector 81.

Thus, also in Embodiment 6, it is possible to stably maintain the fitting state between the first connector 71 and the second connector 81 and connect the pair of second contacts 83 and the plurality of fourth contacts 63 of the second connector 81 to the pair of connection portions 74A and the plurality of connection portions 74B of the circuit board 74 with a simple structure without the use of a dedicated mechanism for locking the fitting state, as with Embodiments 1 to 5.

Embodiment 7

Figure 63:
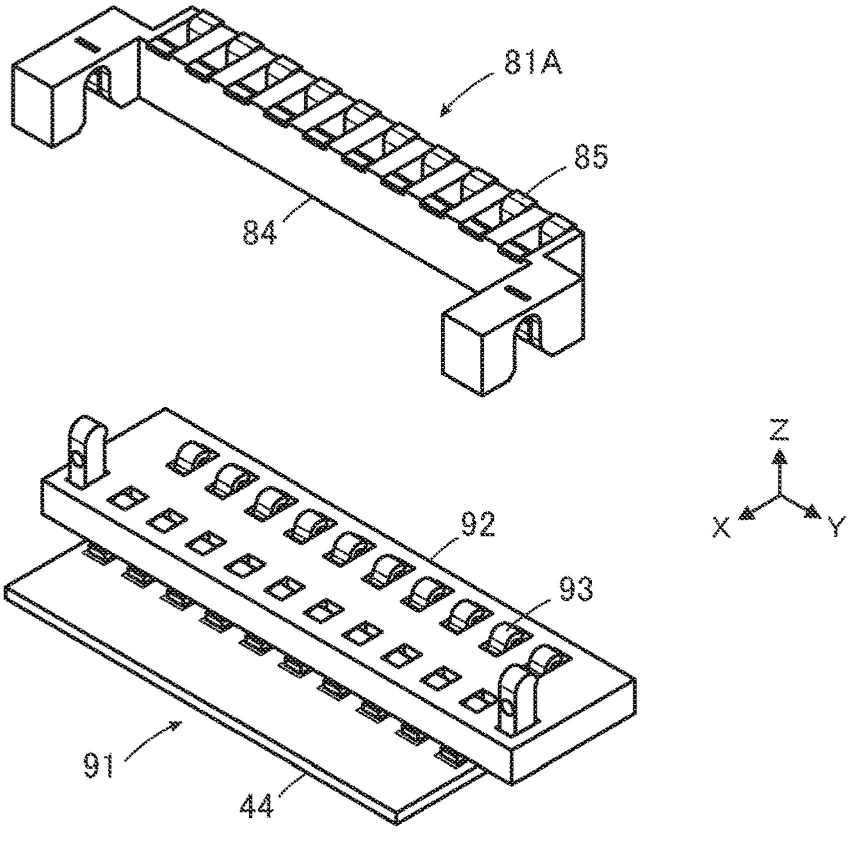
FIG. 63 is a perspective view showing a connector assembly of Embodiment 7 before fitting.

FIG. 63 shows a connector assembly according to Embodiment 7 before fitting. The connector assembly is composed of a first connector 91 and a second connector 81A to be fitted to each other.

The first connector 91 includes a first insulator 92 made of an insulating material and a plurality of first contacts 93 retained in the first insulator 92. The plurality of first contacts 93 are attached to the circuit board 44.

The second connector 81A includes a second insulator 84 made of an insulating material and a plurality of second contacts 85 retained in the second insulator 84.

The plurality of first contacts 93 and the plurality of second contacts 85 are aligned at the same alignment pitch in the Y direction.

Figure 64:
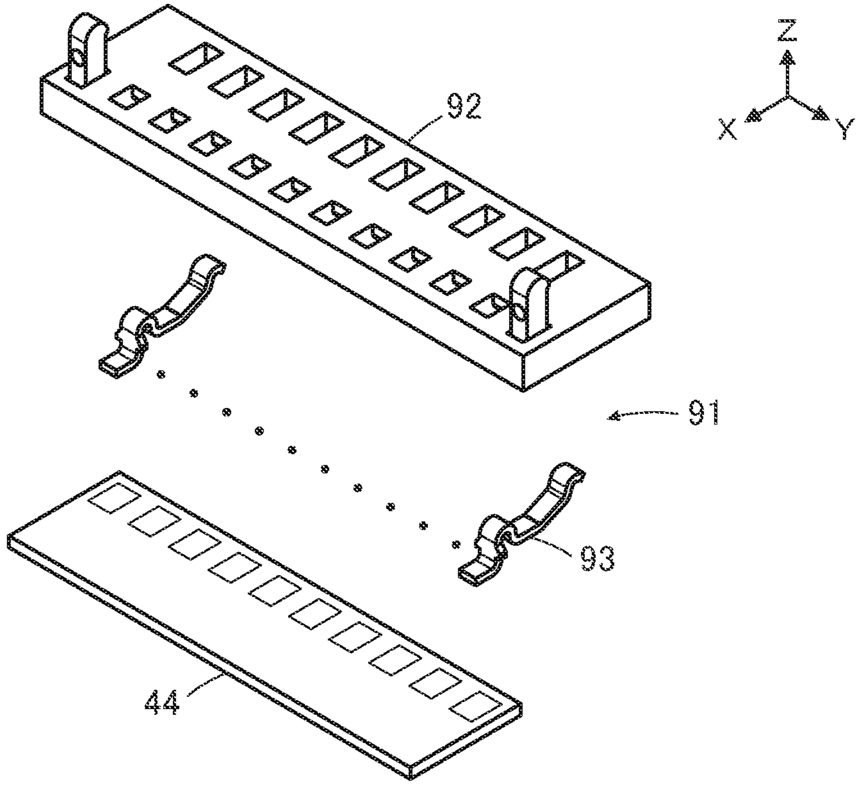
FIG. 64 is an exploded perspective view of a first connector in Embodiment 7.

FIG. 64 is an exploded perspective view of the first connector 91. The plurality of first contacts 93 are disposed on the −Z direction side from the first insulator 92, and the circuit board 44 is disposed on the −Z direction side from the plurality of first contacts 93.

The first contact 93 herein has the same structure as the third contact 53 used in Embodiment 5 and shown in FIG. 47, and the circuit board 44 herein is identical to that used in Embodiment 4 and shown in FIG. 39.

Figure 65:
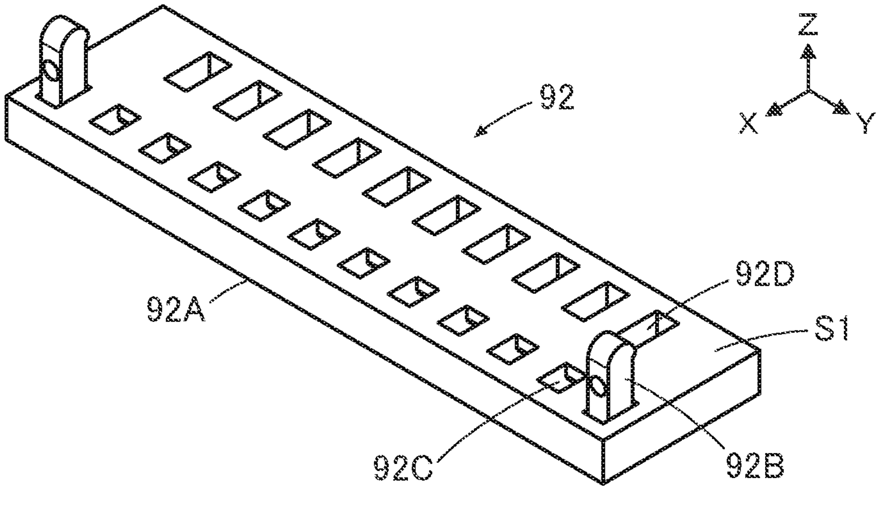
FIG. 65 is a perspective view showing a first insulator used in the first connector in Embodiment 7.

As shown in FIG. 65, the first insulator 92 includes a flat plate portion 92A elongated in the Y direction along an XY plane and a first exposed surface S1 formed by the top surface, on the +Z direction side, of the flat plate portion 92A. A pair of retention projections 92B disposed at the opposite ends in the Y direction and projecting in the +Z direction from the first exposed surface S1 are formed on the +X direction side of the flat plate portion 92A. A plurality of through-holes 92C aligned in the Y direction and penetrating the flat plate portion 92A in the Z direction are formed between the pair of retention projections 92B. In addition, a plurality of through-holes 92D aligned in the Y direction and penetrating the flat plate portion 92A in the Z direction are formed on the −X direction side of the flat plate portion 92A.

The plurality of through-holes 92C and the plurality of through-holes 92D are situated at the same Y-directional positions and aligned at the same alignment pitch in the Y direction.

The plurality of through-holes 92C and the plurality of through-holes 92D correspond to the plurality of first contacts 93.

Figure 66:
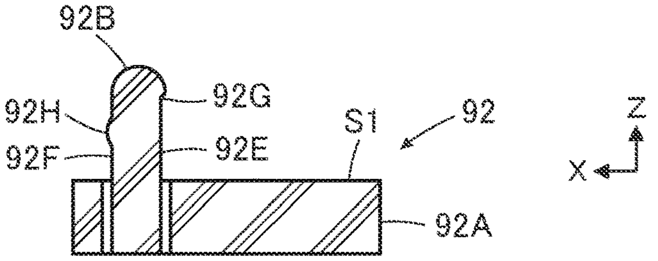
FIG. 66 is a cross-sectional view showing the first insulator used in the first connector in Embodiment 7.

As shown in FIG. 66, the retention projection 92B of the first insulator 92 has a lateral surface 92E facing the −X direction and a lateral surface 92F facing the +X direction, and the lateral surface 92E is provided at its +Z directional end with a hook portion 92G protruding in a right angle shape or a chevron shape and facing the −X direction and the −Z direction. The lateral surface 92F is provided with a protrusion portion 92H protruding in the +X direction on the −Z direction side from the hook portion 92G at a position closer to the base portion of the retention projection 92B than the hook portion 92G is.

Figure 67:
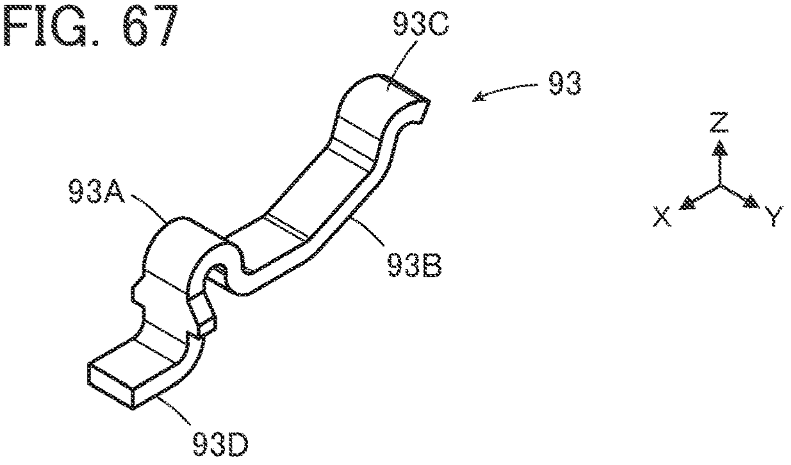
FIG. 67 is a perspective view showing a first contact used in the first connector in Embodiment 7.

As shown in FIG. 67, the first contact 93 herein has the same structure as the third contact 53 used in Embodiment 5 and shown in FIG. 47. That is, the first contact 93 is formed from a band-shaped plate member made of a conductive material such as metal and includes a U-shaped portion 93A. A cantilever portion 93B extends in the −X direction and the +Z direction from the −Z directional end of the U-shaped portion 93A, and the −X directional end of the cantilever portion 93B is provided with a curved portion 93C curving in a convex shape toward the +Z direction. Further, a connection portion 93D extends in the +X direction from the −Z directional end of the U-shaped portion 93A.

When the first connector 91 is assembled, the U-shaped portions 93A of the plurality of first contacts 93 are inserted into the corresponding through-holes 92C of the first insulator 92 from the −Z direction, and in this state, the connection portions 93D of the plurality of first contacts 93 are connected to the plurality of connection portions 44A of the circuit board 44 by soldering or other means.

In the first connector 91 configured as above, a first contacting portion P1 facing the −X direction and the −Z direction is set by the hook portion 92G of the retention projection 92B of the first insulator 92, and a second contacting portion P2 facing the +X direction and situated on the −Z direction side from the first contacting portion P1 is set by the protrusion portion 92H of the retention projection 92B.

In addition, the U-shaped portion 93A of the first contact 93 is inserted into the corresponding through-hole 92C of the first insulator 92, so that the curved portion 93C formed at the end of the cantilever portion 93B of the first contact 93 projects in the +Z direction from the first exposed surface S1 through the corresponding through-hole 92D of the first insulator 92. A third contacting portion P3 facing the +Z direction is set by this curved portion 93C.

Figure 68:
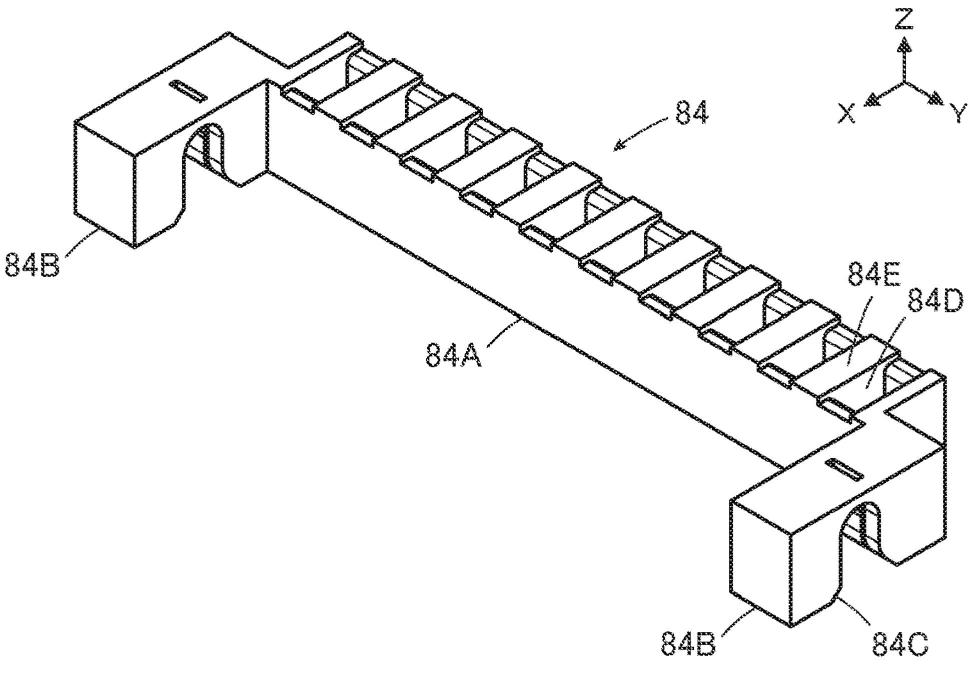
FIG. 68 is a perspective view showing a second insulator used in a second connector in Embodiment 7.

As shown in FIG. 68, the second insulator 84 has a structure in which a pair of arm portions 84B extending in the +X direction are joined separately to the opposite ends, in the Y direction, of a body portion 84A of rectangular cuboid shape elongated in the Y direction.

The pair of arm portions 84B each have a projection accommodating portion 84C of recess shape to accommodate the retention projection 92B of the first insulator 92.

The body portion 84A has a plurality of contact accommodating portions 84D of recess shape that are aligned in the Y direction and each accommodate the second contact 85. The contact accommodating portion 84D is formed by a through-hole penetrating the body portion 84A in the Z direction. A partition plate 84E extending along an XZ plane is formed between adjacent contact accommodating portions 84D.

Figure 69:
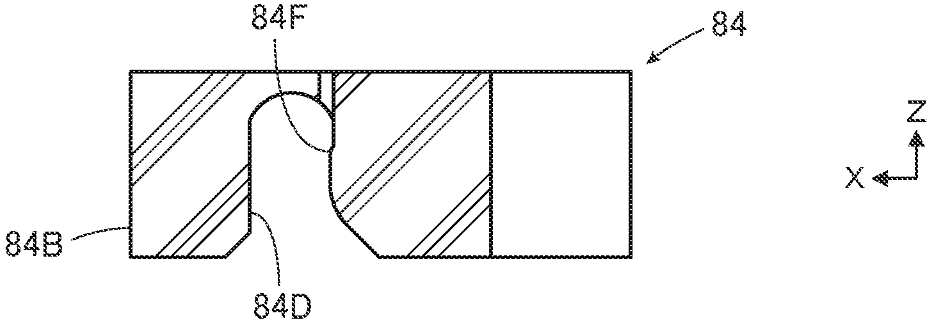
FIG. 69 is a cross-sectional view showing the second insulator used in the second connector in Embodiment 7.

As shown in FIG. 69, the projection accommodating portion 84C of the arm portion 84B is constituted of a recess portion opening toward the −Z direction, and the inner surface of the projection accommodating portion 84C on the −X direction side is provided with a receiving portion 84F formed by a concavity for receiving the hook portion 92G of the retention projection 92B.

The second connector 81A is assembled by inserting the second contacts 85 into the plurality of contact accommodating portions 84D of the body portion 84A of the second insulator 84 from the +Z direction.

Figure 70:
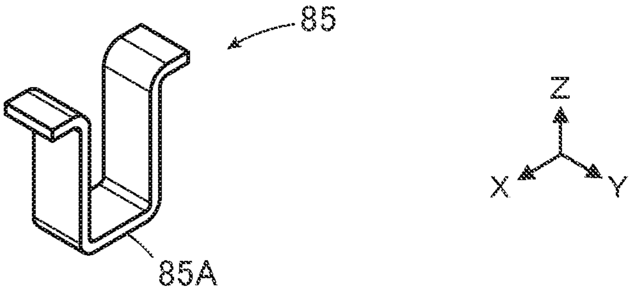
FIG. 70 is a perspective view showing a second contact used in the second connector in Embodiment 7.

As shown in FIG. 70, the second contact 85 herein has the same structure as the fourth contact 63 used in Embodiment 5 and shown in FIG. 49. That is, the second contact 85 is formed from a band-shaped plate member made of a conductive material such as metal and is bent in a U shape opening toward the +Z direction. The −Z directional end of the second contact 85 is provided with a flat plate portion 85A extending along an XY plane and constituting a bottom portion of the U shape.

Figure 71:
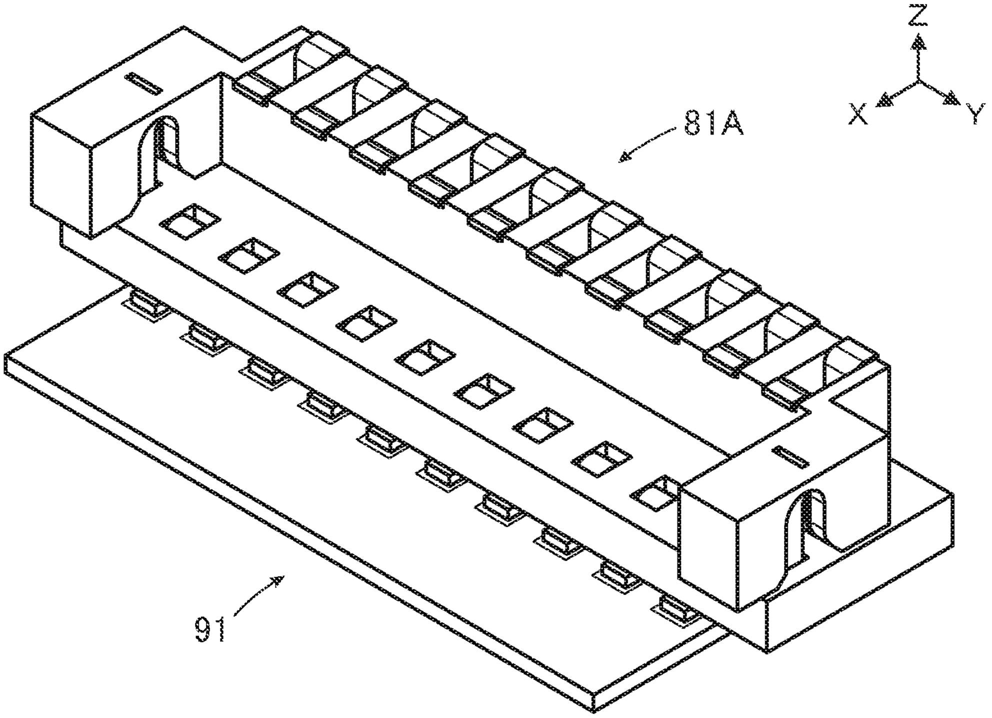
FIG. 71 is a perspective view showing the connector assembly of Embodiment 7 in a fitting state.

From the state where the second connector 81A is disposed on the +Z direction side from the first connector 91 as shown in FIG. 63, the second connector 81A is moved in the −Z direction and thereby fitted to the first connector 91 as shown in FIG. 71.

Figure 72:
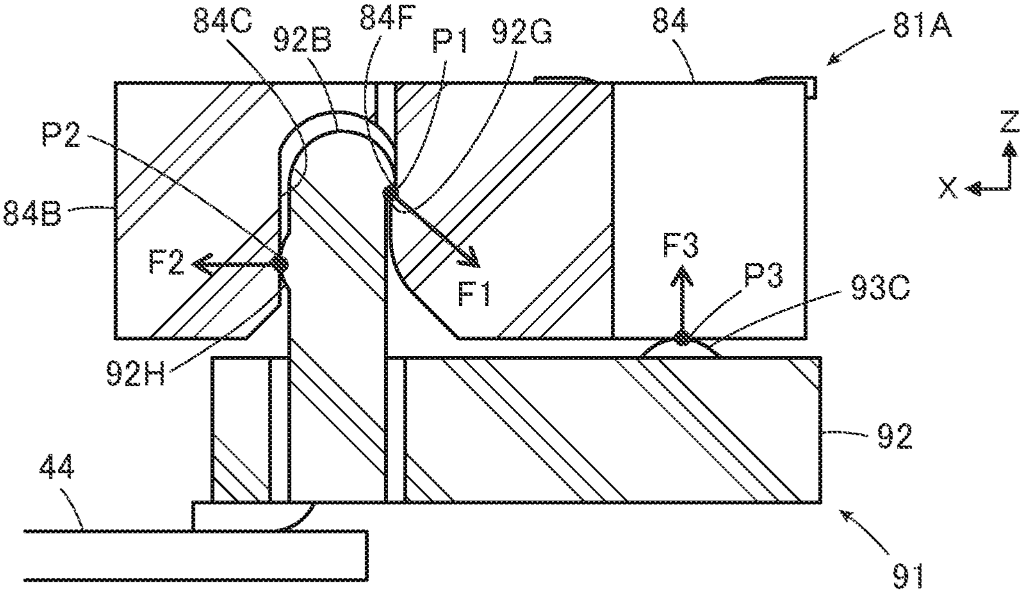
FIG. 72 is a partial cross-sectional view showing the connector assembly of Embodiment 7 in the fitting state in a cross section passing through a retention projection and a projection accommodating portion.

At this time, as shown in FIG. 72, a +Z directional portion of the retention projection 92B of the first connector 91 is inserted into the projection accommodating portion 84C of the arm portion 84B of the second connector 81A from the −Z direction, the first contacting portion P1 set by the hook portion 92G of the retention projection 92B makes contact with the receiving portion 84F of the projection accommodating portion 84C, and the second contacting portion P2 set by the protrusion portion 92H of the retention projection 92B makes contact with the inner surface of the projection accommodating portion 84C.

Figure 73:
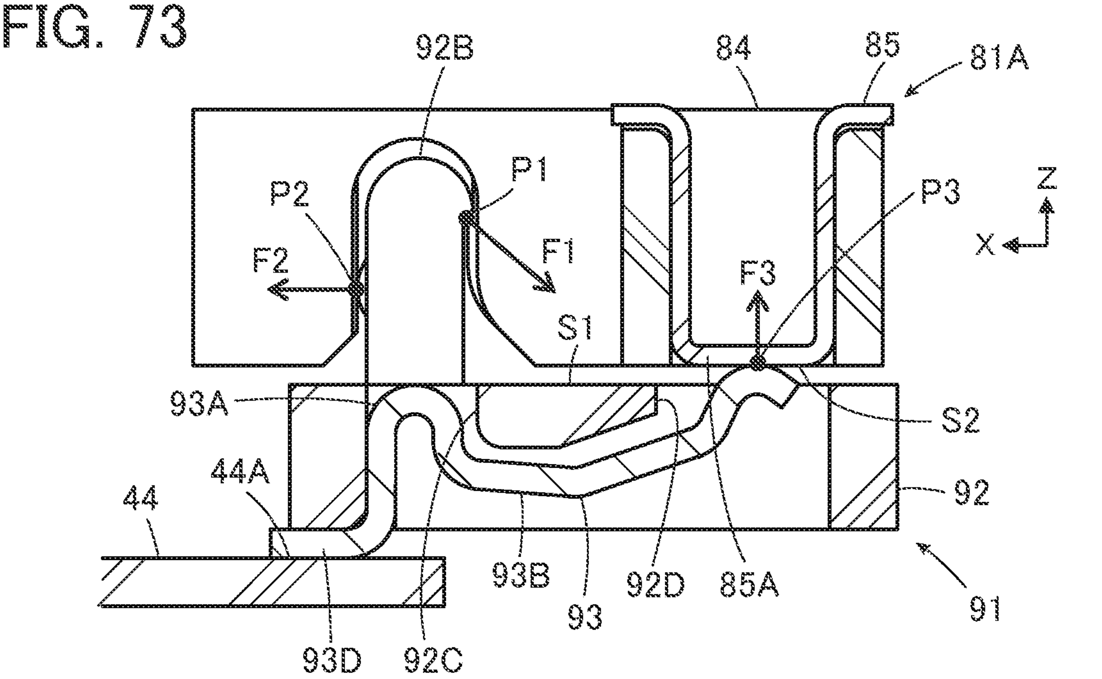
FIG. 73 is a partial cross-sectional view showing the connector assembly of Embodiment 7 in the fitting state in a cross section passing through the first contact and the second contact.
Figure 74:
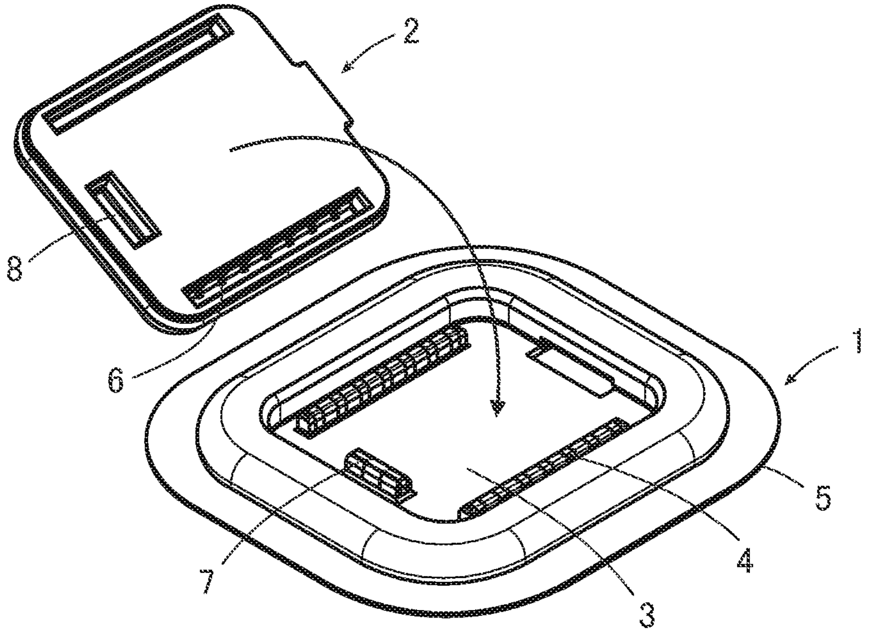
FIG. 74 PRIOR ART
FIG. 74 is a perspective view showing a conventional connector.

Further, the third contacting portion P3 set by the curved portion 93C formed at the end of the cantilever portion 93B of each of the plurality of first contacts 93 makes contact with the bottom surface of the flat plate portion 85A of the corresponding second contact 85, as shown in FIG. 73.

Consequently, the second connector 81A receives forces F1 acting in the −X direction and the −Z direction from the first contacting portions P1 of the pair of retention projections 92B of the first connector 91, forces F2 acting in the +X direction from the second contacting portions P2 of the pair of retention projections 92B of the first connector 91, and forces F3 acting in the +Z direction from the third contacting portions P3 of the plurality of first contacts 93 of the first connector 91.

A resultant force of those forces F1, a resultant force of those forces F2, and a resultant force of those forces F3 balance, and the moments balance; therefore, the second connector 81A is stably supported with respect to the first connector 91, and the fitting state of the second connector 81A with respect to the first connector 91 is maintained.

The third contacting portions P3 of the plurality of first contacts 93 make contact with the bottom surfaces of the flat plate portions 85A of the second contacts 85, whereby the plurality of first contacts 93 are electrically connected to the corresponding second contacts 85.

The connection portions 93D of the plurality of first contacts 93 of the first connector 91 are connected to the plurality of connection portions 44A of the circuit board 44, so that the plurality of second contacts 85 of the second connector 81A are electrically connected to the plurality of connection portions 44A of the circuit board 44 via the plurality of first contacts 93 in the fitting state between the first connector 91 and the second connector 81A.

Thus, also in Embodiment 7, it is possible to stably maintain the fitting state between the first connector 91 and the second connector 81A and connect the plurality of second contacts 85 of the second connector 81A to the plurality of connection portions 44A of the circuit board 44 with a simple structure without the use of a dedicated mechanism for locking the fitting state, as with Embodiments 1 to 6.

The tab sheet 14 is not used in Embodiments 3 to 7; however, by attaching the first connector 31, 31A, 41, 51, 71, 91 to the tab sheet 14 made of, for instance, cloth of a garment as in Embodiments 1 and 2, the first connector 31, 31A, 41, 51, 71, 91 may be used as a garment-side connector, and the second connector 21, 61, 81, 81A may be used as a module-side connector.

In an opposite manner, the second connector 21, 61, 81, 81A in Embodiments 1 to 7 may be used as a garment-side connector to be attached to a garment, and the first connector 11, 11A, 31, 31A, 41, 51, 71, 91 in those embodiments may be used as a module-side connector to be fitted to the garment-side connector.

While the circuit board 17, 19, 44, 74 extends along an XY plane in parallel to the first exposed surface S1 of the first connector 11, 11A, 41, 51, 71, 91 in Embodiments 1, 2, and 4 to 7, the invention is not limited thereto, and use may be made of a circuit board extending in a fitting direction along a YZ plane as with the circuit board 34 in Embodiment 3. Further, the first contact 13, 43, 73, 93 in Embodiments 1, 2, and 4 to 7 may be connected to a cable in place of the circuit board, as with the modification of Embodiment 3.

What is claimed is:

1. A connector assembly including a first connector and a second connector that are fitted to each other along a fitting direction such that a second contact of the second connector is electrically connected to a first contact of the first connector, wherein the first connector includes a first exposed surface facing the second connector and a retention projection projecting in the fitting direction from the first exposed surface toward the second connector, the second connector includes a second exposed surface facing the first connector and a projection accommodating portion of recess shape which is formed at the second exposed surface and in which at least a part of the retention projection is accommodated, the first connector includes: a first contacting portion disposed on a lateral surface of the retention projection; a second contacting portion disposed on a lateral surface of the retention projection opposite to the lateral surface having the first contacting portion thereon, at a position closer to a base portion of the retention projection than the first contacting portion is; and a third contacting portion disposed on the first exposed surface at a position away from the lateral surface, having the first contacting portion thereon, of the retention projection in an opposite direction from the second contacting portion, and when the first connector and the second connector are fitted to each other, at least a part of the retention projection is accommodated in the projection accommodating portion, the first contacting portion and the second contacting portion separately make contact with an inner surface of the projection accommodating portion, and the third contacting portion makes contact with the second exposed surface, whereby a fitting state between the first connector and the second connector is maintained, wherein the retention projection includes a hook portion protruding in a direction perpendicular to the fitting direction and having the first contacting portion at its end, and the projection accommodating portion includes a receiving portion that receives the hook portion.

2. The connector assembly according to claim 1, wherein a ratio LZ/LX of a distance LZ between the first contacting portion and the second contacting portion in the fitting direction to a distance LX between the first contacting portion and the third contacting portion in a direction perpendicular to the fitting direction is not greater than an incline S of a normal line with respect to the direction perpendicular to the fitting direction, the normal line being perpendicular to a tangent plane formed by the hook portion and the receiving portion contacting each other when the hook portion is received by the receiving portion.

3. The connector assembly according to claim 1, wherein the second connector is a garment-side connector attached to a garment, and the first connector is a module-side connector detachably fitted to the garment-side connector.

4. The connector assembly according to claim 1, wherein the first connector includes a first insulator retaining the first contact, the second connector includes a second insulator retaining the second contact, at least a part of the first exposed surface is formed by the first insulator, at least a part of the second exposed surface is formed by the second insulator, the retention projection is formed by the first contact, and the projection accommodating portion is formed by the second contact.

5. The connector assembly according to claim 4, wherein the third contacting portion is formed by a protuberance portion formed in the first insulator, and the second contact forms a part of the second exposed surface with which the third contacting portion makes contact.

6. The connector assembly according to claim 5, wherein the first connector includes: a plurality of the first contacts retained by the first insulator and aligned in an alignment direction perpendicular to the fitting direction; and a plurality of the protuberance portions formed in the first insulator and aligned in the alignment direction, the second connector includes a plurality of the second contacts retained by the second insulator and aligned in the alignment direction, a plurality of the first contacting portions and a plurality of the second contacting portions are formed by the plurality of the first contacts, and a plurality of the third contacting portions are formed by the plurality of the protuberance portions.

7. The connector assembly according to claim 4, wherein the first connector includes an auxiliary contact retained by the first insulator,
the third contacting portion is formed by the auxiliary contact, and
the second contact forms a part of the second exposed surface with which the third contacting portion makes contact.

8. The connector assembly according to claim 7, wherein the first connector includes: a plurality of the first contacts retained by the first insulator and aligned in an alignment direction perpendicular to the fitting direction; and a plurality of the auxiliary contacts retained by the first insulator and aligned in the alignment direction,
the second connector includes a plurality of the second contacts retained by the second insulator and aligned in the alignment direction,
a plurality of the first contacting portions and a plurality of the second contacting portions are formed by the plurality of the first contacts, and
a plurality of the third contacting portions are formed by the plurality of the auxiliary contacts.

9. The connector assembly according to claim 4, wherein the third contacting portion is formed by the first contact, and
the second contact forms a part of the second exposed surface with which the third contacting portion makes contact.

10. The connector assembly according to claim 9, wherein the first connector includes a plurality of the first contacts retained by the first insulator and aligned in an alignment direction perpendicular to the fitting direction,
the second connector includes a plurality of the second contacts retained by the second insulator and aligned in the alignment direction, and
a plurality of the first contacting portions, a plurality of the second contacting portions, and a plurality of the third contacting portions are formed by the plurality of the first contacts.

11. The connector assembly according to claim 4, wherein the first connector includes a third contact retained by the first insulator,
the second connector includes a fourth contact retained by the second insulator, and
when the second connector is fitted to the first connector, the fourth contact is electrically connected to the third contact.

12. The connector assembly according to claim 11, wherein the third contacting portion is formed by each of the first contact and the third contact, and
each of the second contact and the fourth contact forms a part of the second exposed surface with which the third contacting portion makes contact.

13. The connector assembly according to claim 12, wherein the first connector includes: a pair of the first contacts retained by the first insulator and disposed at a distance along an alignment direction perpendicular to the fitting direction; and a plurality of the third contacts retained by the first insulator and aligned in the alignment direction between the pair of the first contacts,
the second connector includes: a pair of the second contacts retained by the second insulator and disposed at a distance along the alignment direction; and a plurality of the fourth contacts retained by the second insulator and aligned in the alignment direction between the pair of the second contacts,
a pair of the first contacting portions and a pair of the second contacting portions are formed by the pair of the first contacts, and
a plurality of the third contacting portions are formed by the pair of the first contacts and the plurality of the third contacts.

14. The connector assembly according to claim 11, wherein the third contacting portion is formed by the third contact, and
the fourth contact forms a part of the second exposed surface with which the third contacting portion makes contact.

15. The connector assembly according to claim 14, wherein the first connector includes: a pair of the first contacts retained by the first insulator and disposed at a distance along an alignment direction perpendicular to the fitting direction; and a plurality of the third contacts retained by the first insulator and aligned in the alignment direction between the pair of the first contacts,
the second connector includes: a pair of the second contacts retained by the second insulator and disposed at a distance along the alignment direction; and a plurality of the fourth contacts retained by the second insulator and aligned in the alignment direction between the pair of the second contacts,
a pair of the first contacting portions and a pair of the second contacting portions are formed by the pair of the first contacts, and
a plurality of the third contacting portions are formed by the plurality of the third contacts.

16. The connector assembly according to claim 1, wherein the first connector includes a first insulator retaining the first contact,
the second connector includes a second insulator retaining the second contact,
at least a part of the first exposed surface is formed by the first insulator,
at least a part of the second exposed surface is formed by the second insulator,
the retention projection is formed by the first insulator, and
the projection accommodating portion is formed by the second insulator.

17. The connector assembly according to claim 16, wherein the first connector includes: a pair of the retention projections formed by the first insulator and disposed at a distance along an alignment direction perpendicular to the fitting direction; and a plurality of the first contacts retained by the first insulator and aligned in the alignment direction between the pair of the retention projections,
the second connector includes: a pair of the projection accommodating portions formed by the second insulator and disposed at a distance along the alignment direction; and a plurality of the second contacts retained by the second insulator and aligned in the alignment direction between the pair of the projection accommodating portions,
a pair of the first contacting portions and a pair of the second contacting portions are formed by the pair of the retention projections, and
a plurality of the third contacting portions are formed by the plurality of the first contacts.

18. The connector assembly according to claim 1, wherein the first connector is a garment-side connector attached to a garment, and the second connector is a module-side connector detachably fitted to the garment-side connector.

19. The connector assembly according to claim 18, wherein the first contact is electrically connected to a cable.

20. The connector assembly according to claim 18, wherein the first contact is electrically connected to the circuit board.

21. The connector assembly according to claim 20, wherein the circuit board extends in parallel to the first exposed surface.

22. The connector assembly according to claim 20, wherein the circuit board extends along the fitting direction.

* * * * *